US008660006B2

(12) United States Patent
Torres et al.

(10) Patent No.: US 8,660,006 B2
(45) Date of Patent: Feb. 25, 2014

(54) METHOD AND SYSTEM FOR TRAFFIC MANAGEMENT AND RESOURCE ALLOCATION ON A SHARED ACCESS NETWORK

(75) Inventors: Robert Torres, New Market, MD (US); John Border, Adamstown, MD (US); Patrick Stevens, Mount Airy, MD (US); Jun Xu, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 154 days.

(21) Appl. No.: 13/306,199

(22) Filed: Nov. 29, 2011

(65) Prior Publication Data

US 2013/0135996 A1   May 30, 2013

(51) Int. Cl.
*H04L 1/00*   (2006.01)
(52) U.S. Cl.
USPC ............................ 370/235; 370/401; 370/468
(58) Field of Classification Search
USPC ................ 370/229–235, 468; 455/450–452.2
See application file for complete search history.

(56) References Cited

U.S. PATENT DOCUMENTS

| | | |
|---|---|---|
| 2008/0049659 A1 | 2/2008 | Ram et al. |
| 2008/0298299 A1 | 12/2008 | Thesling |

FOREIGN PATENT DOCUMENTS

DE   102006025037 B3   9/2007

OTHER PUBLICATIONS

Collin-Nocker et al., "Class Based Scheduling for DVB-S2", Satellite and Space Communications, Sep. 9, 2009, pp. 240-243.
"Digital Video Broadcasting (DVB); Generic System Encapsulation (GSE) implementation guidelines", Technical Specification, European Telecommunications Standards Institute, May 31, 2011, pp. 12-35, vol. BROADCAS, No. V1.2.1.
European Search Report issued Apr. 11, 2013 for corresponding EP Appln. No. 12194700.6.

*Primary Examiner* — Pao Sinkantarakorn
(74) *Attorney, Agent, or Firm* — K&L Gates LLP

(57) ABSTRACT

A method for traffic management and resource allocation on a shared access network including estimating a bandwidth capacity of a gateway, determining a demand rate of an IP gateway, allocating bandwidth to the IP gateway based on the demand rate, traffic priority, or traffic weighting, allocating bandwidth to the IP gateway in advance of demand when excess bandwidth is available, scheduling traffic at the IP gateway based on traffic priority, service plan of a VSAT, or physical layer properties of the VSAT, performing priority queue servicing of traffic at a gateway using a real time traffic priority queue, a non-real time traffic priority queue, two or more modulation and coding queue groups, and a code block queue.

10 Claims, 7 Drawing Sheets

METHOD AND SYSTEM FOR TRAFFIC MANAGEMENT AND RESOURCE ALLOCATION ON A SHARED ACCESS NETWORK

BACKGROUND

In a network environment with shared access, such as the outroute of a DVB-S2 based satellite network, and fluctuating bandwidth availability due to, for example, physical layer characteristics, traffic may be admitted, shaped, or shed, and backpressure may be provided to ingress traffic as a function of either a static estimate of the available bandwidth based on the mean and standard deviation of typical conditions, a semi-static estimate of the available bandwidth based on historical analysis of the conditions, or a slow moving tracking of the long term changes of the conditions. These methods of managing traffic may not optimize the usage of the shared access and, thus, may not correctly schedule traffic in a manner that honors quality of service (QoS) requirements.

On a shared access network where the available bandwidth can fluctuate, the traffic from numerous sources may be multiplexed into a data stream that may be transmitted over an air interface. Due to various QoS requirements and customer classification criteria, the incoming traffic data may first be grouped into multiple IP layer and acceleration gateways before multiplexing into a link layer gateway, where the data stream to be sent over the air interface is formed. In a DVB-S2 system, the IP layer and link gateway may be referred to as the IP gateway (IPGW) and the satellite gateway (SGW), or gateway, respectively. The data stream may be broadcast to remote network nodes, such as Very Small Aperture Terminals (VSATs).

Network resource management and traffic flow control may be used to efficiently utilize the available bandwidth and at the same time provide satisfactory QoS to different traffic classes.

BRIEF SUMMARY

It is an object of the present invention to provide a method and system for traffic management and resource allocation on a shared access network.

In accordance with an aspect of the present invention, a method for traffic management and resource allocation on a shared access network includes estimating a bandwidth capacity of a gateway, determining a demand rate of an IP gateway, allocating bandwidth to the IP gateway based on the demand rate, traffic priority, or traffic weighting, allocating bandwidth to the IP gateway in advance of demand when excess bandwidth is available, scheduling traffic at the IP gateway based on traffic priority, service plan of a VSAT, or physical layer properties of the VSAT, performing priority queue servicing of traffic at a gateway using a real time traffic priority queue, a non-real time traffic priority queue, two or more modulation and coding queue groups, and a code block queue.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
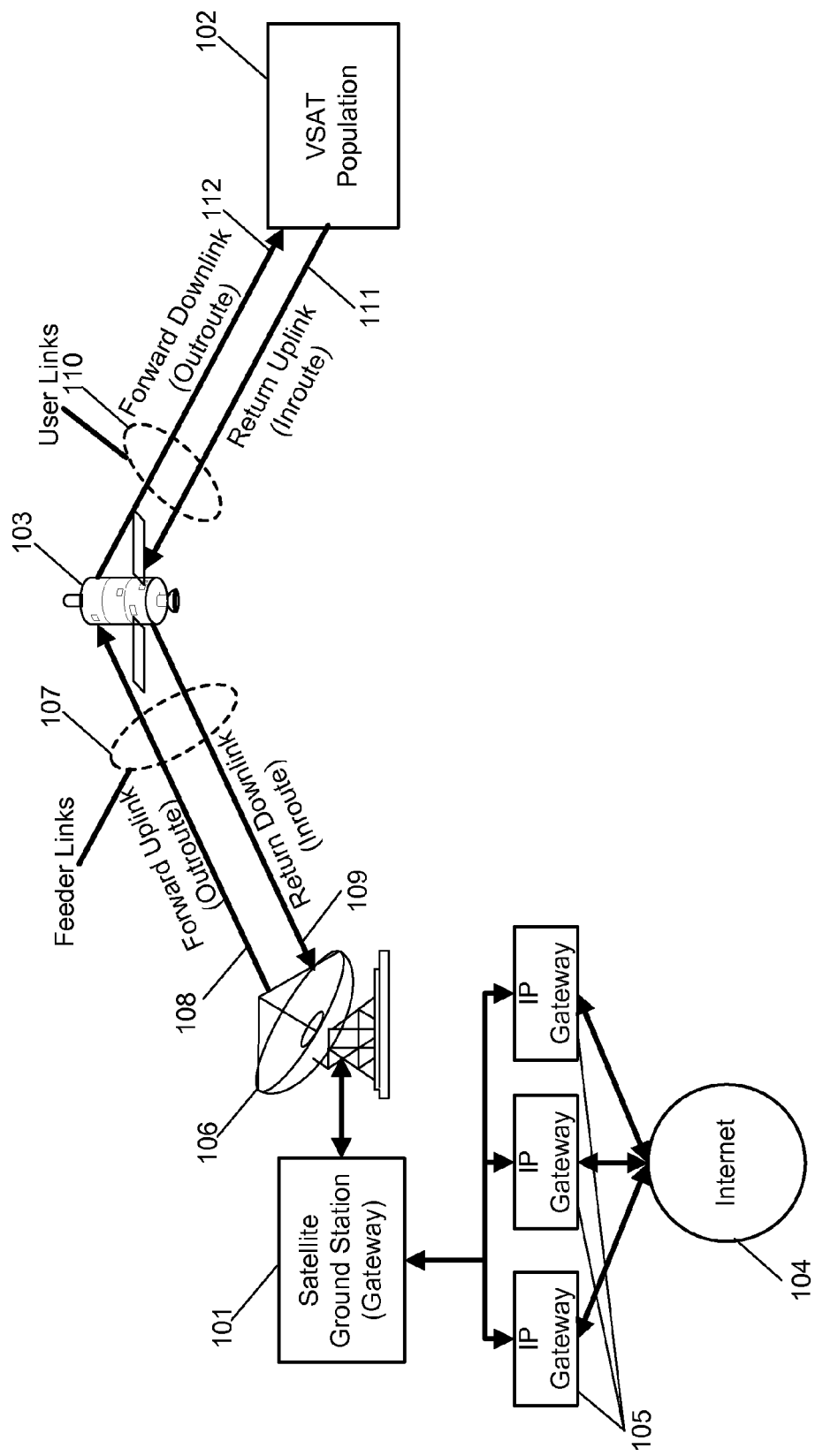
FIG. 1 depicts an exemplary satellite communications system.

FIG. 1 depicts an exemplary satellite communications system. The satellite communications system may include a satellite ground station, or gateway, 101, a Very Small Aperture Terminal (VSAT) population 102, a satellite 103, the Internet 104, IP gateways 105, and a RF terminal 106. The satellite communications system may be one type of shared access network. Other types of shared access networks may include wireless networks such as 4G LTE and WiMAX networks, which may include terminals other than VSATs, such as cellular and WiFi equipped devices.

The gateway 101 may be connected to the VSATs in the VSAT population 102 through the satellite 103. Feeder links 107 may carry data between the gateway 101 and the satellite 103, and may include a forward uplink 108 for transmitting data from the gateway 101 to the satellite 103, and the return downlink 109 for transmitting data from the satellite 103 to the gateway 101. User links 110 may carry data between the satellite 103 and the VSAT population 102, and may include the return uplink 111 for transmitting data from a VSAT to the satellite 103, and a forward downlink 112 for transmitting data from the satellite 103 to a VSAT. The forward uplink 108 and the forward downlink 112 may form an outroute, and the return uplink 111 and the return downlink 109 may form an inroute. The gateway 101 may be high capacity, large antenna earth stations with connectivity to ground telecommunications infrastructure. The gateway 101 may be connected to the RF Terminal (RFT) 106. The RFT 106 may include an antenna, electronics and connectivity to allow for communications access to the satellite 103. The RFT 106 may be the physical equipment responsible for the sending and receiving of signals to and from the satellite 103, and may provide an air interface for the gateway 101.

The VSAT population 102 may include a number of VSATs or Mobile Satellite Terminals, which may be used by end users to access the satellite communications system. A VSAT may include a remote satellite dish for receiving RF signals from and transmitting RF signals to the satellite 103, a satellite modem and other equipment for managing the sending and receiving of data, and one or more remote hosts, which may be computer systems or other electronic devices capable of network communications at a site remote the gateway 101. For example, a VSAT may be used at a residence or place of business to provide access to the Internet 104.

The satellite 103 may be any suitable communications satellite for connecting the hub 101 to the remote hosts 116. For example, the satellite 103 may be a simple bent-pipe design geostationary satellite, which can accommodate innovations and variations in transmission parameters, operating in the Ka-band. The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The gateway 101 may include the IP gateways 105. The IP gateways 105 may be the ingress portion of the local network at the gateway 101. Data from outside the gateway 101 may enter the gateway 101 through the IP gateways 105. The IP gateways 105 may include a spoofer, which may acknowledge IP traffic, including TCP traffic, sent to the gateway 101. The gateway 101 may be connected to the Internet 104 through the IP gateways 105. IP traffic, including TCP traffic, from the Internet 104 may enter the gateway 101 through the IP gateways 105. Remote terminals connected to VSATs in the VSAT population 102 may connect to the Internet 104 through the satellite 103 and the gateway 101.

Multiple IP gateways 105 may be connected to one gateway 101, sharing the bandwidth of the RFT 106. At each IP gateway 105, real-time (RT) and non-realtime (NRT) traffic flows may be classified into different priorities. These traffic flows may be processed and multiplexed before being forwarded to priority queues at the gateway 101. RT traffic may go directly to the gateway 101 RT priority queue, while NRT traffic flows may be serviced based on the respective priority and volume. The data may be further packed into DVB-S2 code blocks and stored in a code block buffer before transmission.

Data from the Internet 104 intended for a VSAT in the VSAT population 102 may be in the form of IP packets, including TCP packets and UDP packets, or any other suitable IP packets, and may enter the gateway 101 at one of the IP gateways 105, where the spoofer may send acknowledgement back to the sender of the IP packets. The IP packets may be processed and multiplexed by the gateway 101 along with IP packets from the other IP gateways 105, where the IP gateways 105 may or may not have the same service capabilities and relative priorities. The IP packets may then be transmitted to the satellite 103 on the forward uplink 108 using the air interface provided by the RFT 106. The satellite 103 may then transmit the IP packets to the VSAT using the forward downlink 112. This may be the outroute. Similarly, IP packets may enter the ingress at a VSAT in the VSAT population 102, be processed by the VSAT 102, and transmitted to the satellite 103 via the VSAT's air interface on the return uplink 111. The satellite 103 may then send the IP packets to the gateway 101 using the return downlink 109. This may be the inroute.

Figure 2:
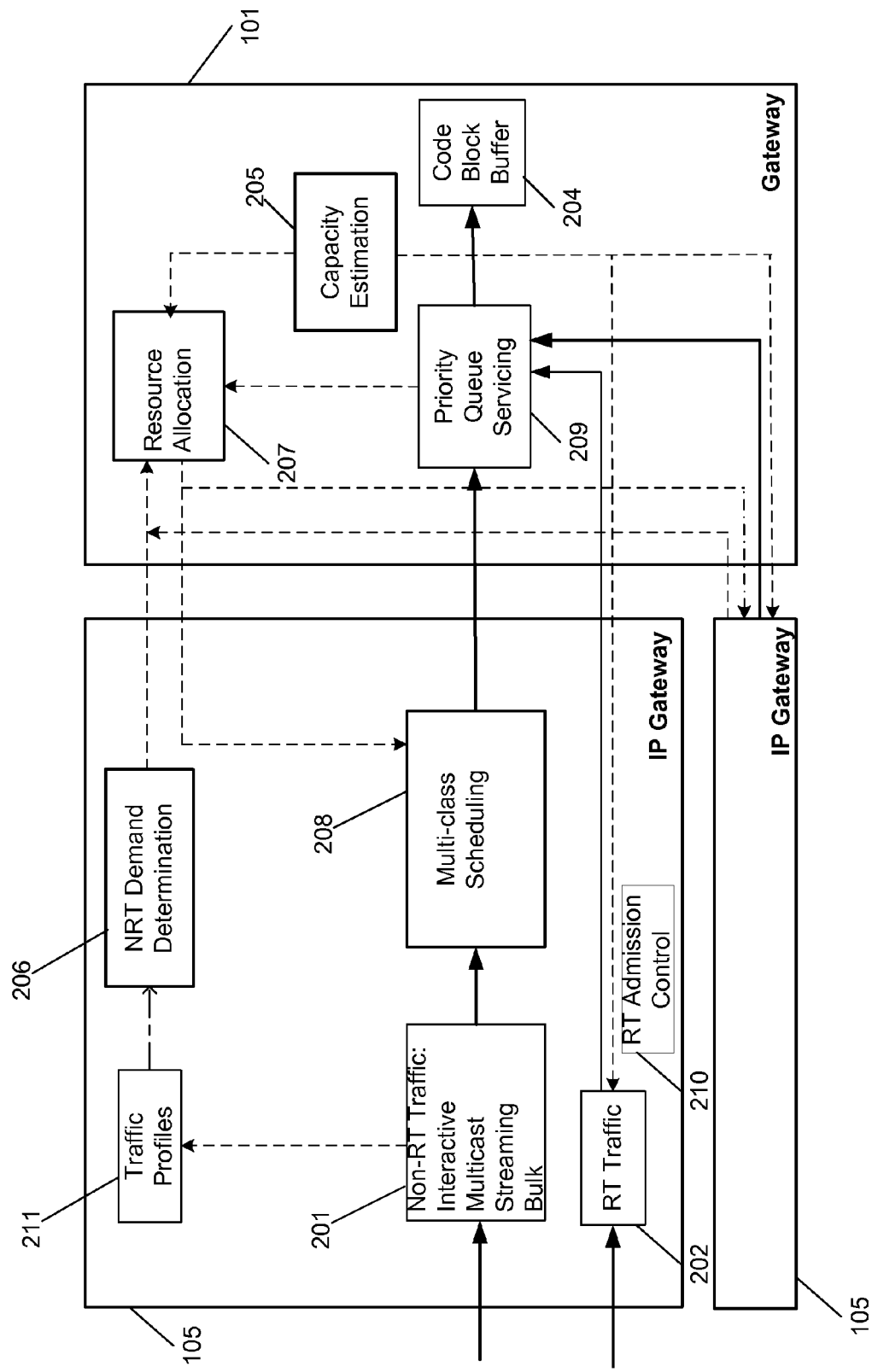
FIG. 2 depicts an exemplary traffic management architecture implemented in a gateway and IP gateways.

FIG. 2 depicts an exemplary traffic management architecture implemented in a gateway and IP gateways. The IP gateways 105 may receive non-RT traffic 201 and RT traffic 202 destined for a VSAT in the VSAT population 102, from, for example, the Internet 104. The non-RT traffic 201 may be, for example, data packets belonging to interactive, multicast, streaming, and bulk traffic. The RT traffic 202 may be, for example, data packets belonging to Voice-over-IP traffic. The gateway 101 and the IP gateways 105 may use a number of algorithms to manage traffic flow and resource allocation. The various algorithms may interact with each other, both within and between the gateway 101 and the IP gateways 105, and may allow for improved spectrum utilization, fairness, latency, and throughput performance of the shared access network. These algorithms may be implemented as a capacity estimation module 205, an NRT demand determination module 206, a resource allocation module 207, a multi-class scheduling module 208, and a priority queue servicing module 209. The algorithms may be used to ensure that the gateway 101 priority queues are sent the NRT traffic 201 at a rate that does to not let the queues be empty but also not allow them to overflow or incur unnecessary latency.

Figure 3:
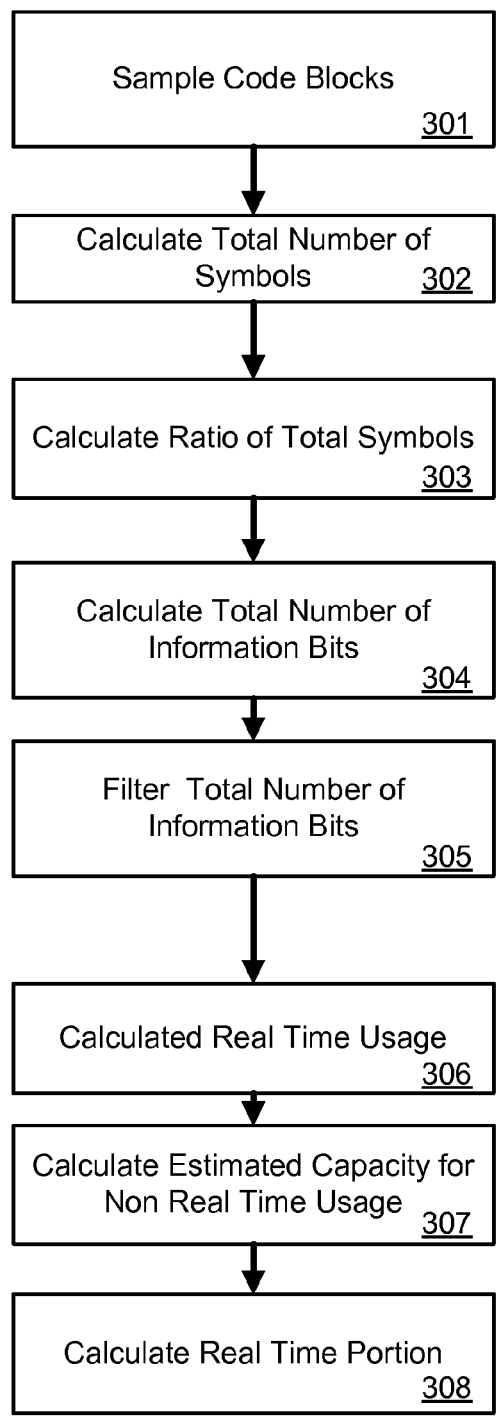
FIG. 3 depicts an exemplary procedure for capacity estimation.

The capacity estimation module 205 may be any suitable combination of hardware and software in the gateway 101 for estimating the available data capacity of the gateway 101 based on the distribution of traffic and how the traffic can be transmitted on the physical layer interface, such as the RFT 106, for example, by using different modulation and coding per remote network node. FIG. 3 depicts an exemplary procedure for capacity estimation.

The capacity estimation module 205 may use an algorithm to estimate the available bandwidth for the RT traffic 202 and NRT traffic 201 of a given DVB-S2 carrier stream, and may operate at a per code rate organizer (CRO) basis. The dynamic change in available bandwidth tracked by the capacity estimation module 205 may be a function of the mix of traffic, the capabilities of the VSATs receiving the traffic, current weather and interference conditions at the VSATs, and current weather and interference conditions at the gateway 101. The output from the capacity estimation module 205 may be used by the resource allocation module 207 as the bandwidth pool upon which dynamic rate allocations are granted. The capacity estimation module 205 may collect code block statistics when code blocks are delivered from modulation and coding (MODCOD) queues to a code block buffer 204. Code blocks may include data from incoming data packets that will be encoded and modulated.

In block 301, the code blocks may be sampled. The capacity estimation module 205 may sample the code blocks passing through the gateway 101. $\Delta T$ may be the IP gateway-gateway flow control update period, and may have a default value of 100 ms. $\Delta t$ may be the sampling interval of code blocks from a MODCOD queue group. With two separate MODCOD groups, the code blocks for RT traffic 202 and NRT traffic 201, the groups may be sampled separately. The capacity estimation module may also handle more than two MODCOD groups. There may be N types of code blocks, and thus N different MODCOD queues per MODCOD group. The total number of code blocks of type (MODCOD) i, i=1, ..., N, may be $K_i$ during the period of $\Delta T$, as determined by summing up the samples of each $\Delta t$. If code blocks can be counted in $\Delta T$, then $\Delta t$ may be insignificant.

In block 302, a total symbol rate may be calculated. $M_i$ may be the number of effective bits per symbol of type i, which may be a function of a modulation and coding rate for MODCOD type i. The total number of bits in one code block may be $b_{CB}$, which may be, for example, 64800 bits or 16200 bits. The total number of symbols, S, for all the code blocks in $\Delta T$ may be $$S = b_{CB} \sum_{i=1}^{N} \frac{K_i}{M_i} \qquad (1)$$

In block 303, a ratio of total symbols may be calculated. R may be the number of symbols per time $\Delta T$, which may be found given the DVB-S2 carrier stream symbol rate for the gateway 101. The ratio, $\eta$, may be calculated according to $$\eta = \frac{R}{S} = \frac{R}{b_{CB} \sum_{i=1}^{N} \frac{K_i}{M_i}} \quad (2)$$

In block 304, the total number of information bits may be calculated. The total number of information bits, X, during time interval ΔT may be expressed as $$X = \sum_{i=1}^{N} \eta \cdot b_{CB} \cdot K_i \cdot \gamma_i = \frac{R \cdot \sum_{i=1}^{N} K_i \cdot \gamma_i}{\sum_{i=1}^{N} \frac{K_i}{M_i}}, \quad (3)$$

where $\gamma_i$ may be the code rate for code block type i.

In block 305, the calculated total number of information bits may be filtered. X(t) may be the overall estimated information rate at time t, in bits per second. The filtered measurement, Y(t) may be calculated according to $$Y(t) = \alpha X(t) + (1-\alpha)Y(t-1), \ 0 < \alpha \leq 1 \quad (4)$$

where α may be determined based on the pre-determined averaging periods. A default value for α may be 0.25 or 0.5. When t=1, Y(t)=X(t).

In block 306, real time usage may be calculated. When calculating the overall outroute capacity at the gateway 101, the number of the code blocks of type i, $K_i$, may include code blocks from both the RT traffic 202 and the NRT traffic 201. To calculate the bandwidth consumed by the RT traffic 202, the exact information bit rate may be used. $K_i$ may be the number of code blocks, and $B_i$ may be information bits per code block of type i. Instant capacity usage during time ΔT may be $$X_{RT} = \sum_{i=1}^{N} K_i \cdot B_i. \quad (5)$$

$X_{RT}(t)$ may be the estimated information rate at time t. The moving average for the bandwidth usage of the RT traffic 202, $Y_{RT}(t)$, may be calculated according to $$Y_{RT}(t) = \alpha X_{RT}(t) + (1-\alpha)Y_{RT}(t-1), \ 0 < \alpha \leq 1. \quad (6)$$

where a default value for α may be 0.25 or 0.5. When t=1, $Y_{RT}(t) = X_{RT}(t)$.

In block 307, the estimated capacity available for non real time traffic may be calculated. The estimated capacity available for the NRT traffic 201, $Y(t)_{NRT}$, may be calculated according to $$Y_{NRT}(t) = Y(t) \cdot (1-\phi) - Y_{RT}(t) \quad (7)$$

where φ may be the overhead percentage.

In block 308, a real time portion may be calculated. The gateway 101 may have a threshold for the RT traffic 202 θ*, which may be an RT threshold. The RT traffic 202 portion, θ, of all traffic entering the gateway 101, may be calculated according to $$\theta = \frac{Y_{RT}(t)}{Y(t)(1-\varphi)} \quad (8)$$

The RT traffic portion may be compared to the RT threshold, and if the RT traffic portion is greater than RT threshold, additional RT traffic 202 may no longer be admitted at the IP gateways 105. For example, if θ*=0.25, and if θ>θ*, there may be no new RT traffic admitted above 25%. The RT portion may be dynamically updated and transparent to all of the IP gateways 105.

The NRT demand determination module 206 may be any suitable combination of hardware and software in the IP gateways 105 for estimating bandwidth demand for non real time traffic, such as the NRT traffic 201, in the next resource allocation period. The NRT demand determination module 206 may provide to the gateway 101, on a per CRO basis, the demand profile of the IP gateway 105, facilitating the decision making for resource allocation in the gateway 101. Demand determination may be based on the current usage of network resource plus a margin that may take into account the short term traffic fluctuation.

Figure 4:
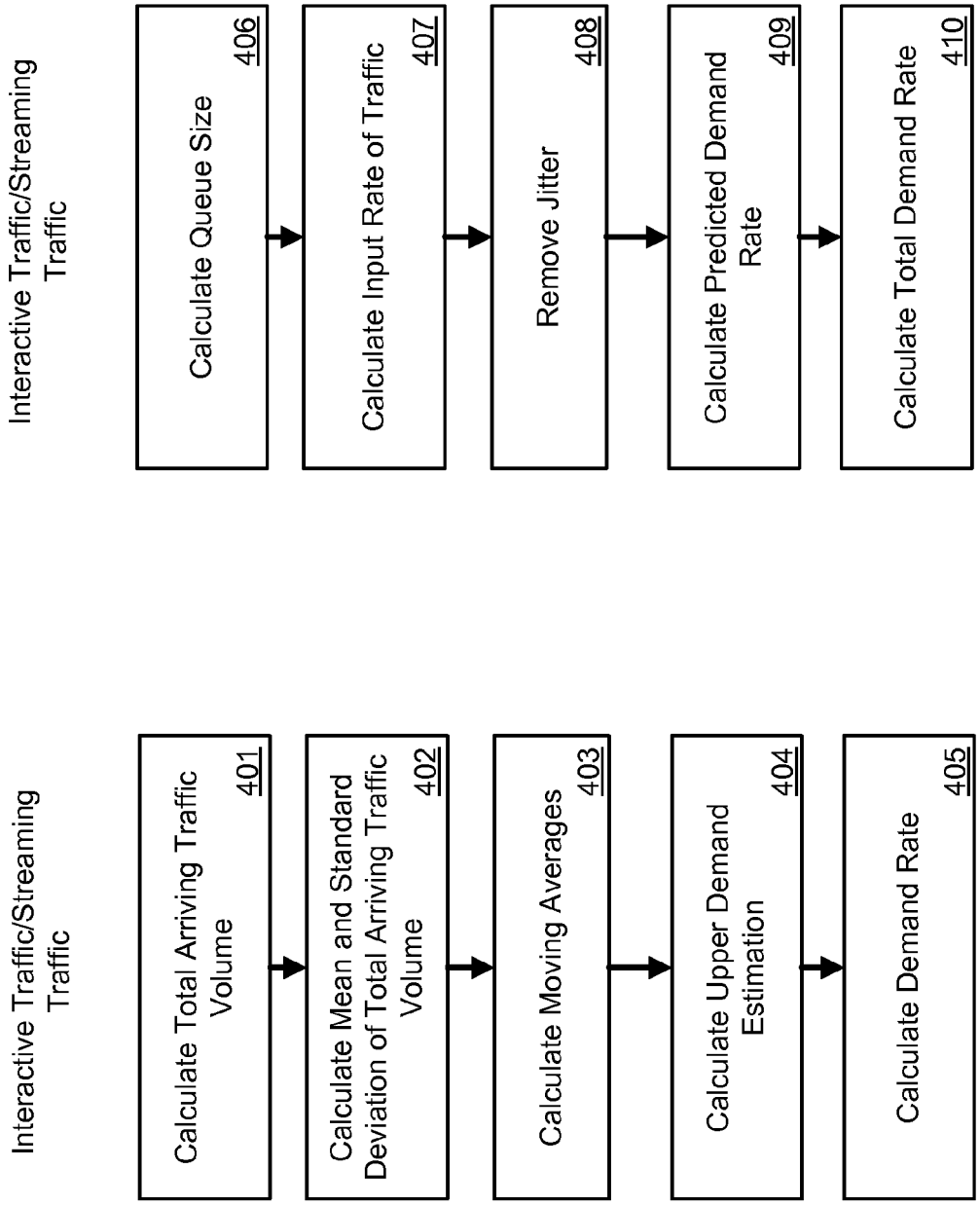
FIG. 4 depicts an exemplary procedure for non-realtime demand determination.

There may be multiple IP gateways 105 and multiple traffic classes, which may be translated to priority levels. Due to TCP spoofing, there may be a TCP Spoofing Queue (TSQ) queue for each TCP connection. For non-spoofed traffic, there may be an arriving queue for each traffic class for each VSAT in the VSAT population 102. All the incoming traffic for the traffic classes may be regulated by a scheduler at the IP gateways 105, such as the multi-class scheduling module 208, before the traffic is sent to the gateway 101 priority queues. To effectively and efficiently utilize the outroute bandwidth resources of the gateway 101, each of the IP gateways 105 may send a request of demand to the gateway 101 on a per CRO basis, and may receive granted rates for scheduling multiple traffic classes. FIG. 4 depicts an exemplary procedure for NRT demand determination.

In block 401, the total arriving traffic volume for interactive traffic may be calculated. The NRT demand determination module 206 may use measurements of the mean and standard deviation of arriving interactive traffic combined with a lower, or minimum, and an upper, or maximum, limit. For a predefined flow control update period ΔT, which may be, for example, 100 ms, with M measurement time frames, if the measurement frame length=20 ms and ΔT=100 ms, then M=5. There may be N active flows. The measured traffic volume, in bytes or bits, of flow i at the j-th frame may be $x_j^{(i)}$, i=1, ..., N, j=1, ..., M. $x_j^{(i)}$ may be obtained by counting the instant amount of packets at j-th frame and multiplying that by the packet size in bytes or bits. The total arriving traffic volume of N flows for each link may be calculated according to $$y_j = \sum_{i=1}^{N} x_j^{(i)} \quad (9)$$

In block 402, a mean and standard deviation of total arriving traffic volume for interactive traffic may be calculated. During every update interval ΔT, the mean, $Y_k$, and standard deviation, $(Y_k)_{std}$, of total arriving traffic volume may be calculated according to $$Y_k = \frac{1}{M}\sum_{j=1}^{M} y_{M \cdot (k-1)+j}, \text{ and} \tag{10}$$

$$(Y_k)_{std} = \sqrt{\frac{1}{M-1}\left(\sum_{j=1}^{M} y_{M \cdot (k-1)+j}^2\right) - \frac{M}{M-1}Y_k^2} \tag{11}$$

where k=1, 2, ... may be the index of update period $\Delta T$.

In block 403, a moving average for total arriving traffic volume for interactive traffic may be calculated. The moving average of both the mean and standard deviation for $Y_k$ may be calculated according to $$\overline{Y}_{k+1} = \beta \cdot Y_k + (1-\beta) \cdot \overline{Y}_k, \text{ and} \tag{12}$$

$$(\overline{Y}_{k+1})_{std} = \beta \cdot (Y_k)_{std} + (1-\beta) \cdot (\overline{Y_k})_{std} \tag{13}$$

When k=1, $\overline{Y}_k = Y_k$, $(\overline{Y}_k)_{std} = 0$. $\beta$ may be a weighing factor, $0 < \beta < 1$. The default value for $\beta$ may be 0.35.

In block 404, an upper demand estimation may be calculated for interactive traffic. Interactive traffic may be subject to a strict delay requirement, so a margin may be provided to accommodate the traffic fluctuation. Conservative upper demand estimation, $Y_{k+1}^{upper}$, may be calculated according to:

$$Y_{k+1}^{upper} = \overline{Y}_{k+1} + d \cdot (\overline{Y}_{k+1})_{std}, \tag{14}$$

where d may be pre-determined with default value of d=3. $d \cdot (\overline{Y}_k)_{std}$ may be referred to as the demand margin for all the flows of interactive traffic class in the IP gateway 105 being serviced by a particular DVB-S2 carrier stream.

In block 405, a demand rate for interactive traffic may be calculated. It may be desirable to impose a lower and an upper bound for the predicted bandwidth usage, $\overline{Y}_{k+1}$, for (k+1)-th update cycle. The lower and upper bound may be denoted as $Y_{min}$, and $Y_{max}$, respectively. $Y_{min}$ may be the lowest that the measurement is allowed to go, and $Y_{max}$ may the largest value the demand rate may be allowed to have. In addition, $Y_{min}$ may allow a quick start-up. The upper and lower bounds may be applied at all times, including to the initial status. $L_i(k)$ may be the recent updated queue size of a VSAT i, and N may be the number of VSATs, counting the existing queue size from last update. The demand rate for interactive traffic $R_{Interactive}^{upper}(k+1)$ may be calculated according to $$R_{Interactive}^{upper}(k+1) = \frac{\min[\max(Y_{min}, Y_{k+1}^{upper}), Y_{max}]}{\Delta T} + \frac{\sum_{i=1}^{N} L_i(k)}{\Delta T} \tag{15}$$

Streaming traffic may have a variable rate and may be mostly continuous in transmission. The multiplexed flows of streaming traffic may be self-similar in time scale. The demand rate for streaming traffic may be calculated according to the procedure in FIG. 4 for calculating the demand rate for interactive traffic class is to be used for streaming traffic. The demand rate for streaming traffic for may be calculated according to $$R_{Streaming}^{upper}(k+1) = \frac{\min[\max(Y_{min}, Y_{k+1}^{upper}), Y_{max}]}{\Delta T} + \frac{\sum_{i=1}^{N} L_i(k)}{\Delta T} \tag{16}$$

where $Y_{k+1}^{upper}$ may be the estimation of aggregated streaming traffic serviced by a particular DVB-S2 carrier stream with margins based on the traffic statistics obtained at time k, $Y_{min}$ and $Y_{max}$ may be the lower and upper limits, respectively, $L_i(k)$ may be the recent updated queue size of VSAT i, and N the number of VSATs.

Calculating the demand rate for background traffic may require taking the measurement of an individual connection's queue size as well as the amount of traffic scheduled during a certain amount of period to estimate the input rate for that connection. With the measured instant queue size and predicted input rate for the incoming cycle, the demand rate may be determined. This may reflect the demand of best effort (BE) traffic and thus reduces the delay for incoming traffic by one cycle (100 ms).

In block 406, a queue size may be calculated. $\lambda_i(k)$ may be the input traffic rate and $\mu_i(k)$ may be the service rate at cycle time k for connection i being serviced by a particular DVB-S2 carrier stream. $L_i(k)$ may be the queue size. $\Delta T$ may be the IP gateway-gateway flow control update time interval. If the input and service rates do not change during time k, $L_i(k)$ may be calculated as:

$$L_i(k) = L_i(k-1) + \lambda_i(k)\Delta k - \mu_i(k)\Delta k = L_i(k-1) + \lambda_i(k)\Delta k - A_i(k), \tag{17}$$

where $A_i(k)$ may be the total scheduled amount of traffic at time k.

In block 407, the input rate of traffic may be calculated by measuring the scheduled traffic volume and the queue size. k may the flow control updating period, and $\Delta T$ may be the flow control update time interval.

$$\lambda_i(k) = \frac{A_i(k) + L_i(k) - L_i(k-1)}{\Delta T} \tag{18}$$

In block 408, jitter may be removed from the calculation of the input rate of traffic. To remove the jitter effect, a prediction function may be used:

$$\hat{\lambda}_i(k+1) = \alpha \lambda_i(k) + (1-\alpha)\hat{\lambda}_i(k). \tag{19}$$

When k=1, $\hat{\lambda}_i(k) = \lambda_i(k)$. $\alpha$ may be a weighing factor, $0 < \alpha < 1$. The default value for $\alpha$ may be 0.35. $r_i(k)$ may be the total traffic rate for time k.

In block 409, an absolute demand rate for background traffic may be calculated. The absolute demand rate for the incoming cycle, at time k+1, may be $$r_i(k+1)\Delta T = L_i(k) + \hat{\lambda}_i(k+1)\Delta T. \tag{20}$$

Thus the predicted demand rate may be $$r_i(k+1) = L_i(k)/\Delta T + \hat{\lambda}_i(k+1). \tag{21}$$

In block 410, the total demand rate for background traffic an IP gateway may be calculated. The total amount of BE (Background traffic class) demand rate of an IP gateway 105 for a particular DVB-S2 carrier stream may be $$R_{BE}(k+1) = \sum_{i=1}^{N} r_i(k+1). \tag{22}$$

The resource allocation module 207 may be any suitable combination of hardware and software in the gateway 101 for performing dynamic bandwidth allocation. Each of the IP gateways 105 may report estimated traffic loads to the gateway 101. The gateway 101 may dynamically allocate bandwidth to the IP gateways 105 according to traffic priority and weights. DVBS-2 carrier stream capacity for the NRT traffic 201 may be allocated by the gateway 101 based on priority demand across the IP gateways 105 served by the same CRO. An overall rate allocation for each priority class from gateway 101 to IP gateways 105 may be estimated. A detailed rate assignment for each priority of an individual IP gateway 105 may then be based on the demand request from each IP gateway 105.

Figure 5:
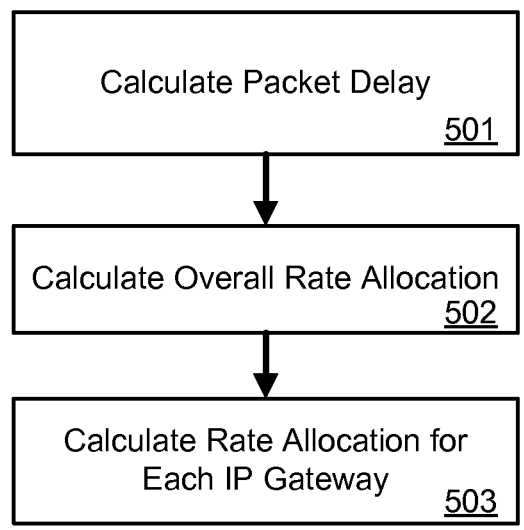
FIG. 5 depicts an exemplary procedure for resource allocation.

FIG. 5 depicts an exemplary procedure for resource allocation. In block 501, a packet delay measurement may be calculated. Packet delay of priority queue may be the latency between the moment that a data packet arrives at the queue and the moment that the data packet is put in the MODCOD queue. $N_t$ may be the number of data packets put into the MODCOD queues during the period of $t-\Delta t$ to $t$. The average packet delay, $d_{avg}(t)$, at time t may be calculated as $$d_{avg}(t) = \sum_{i=1}^{N_t} d_i / N_t, \tag{23}$$

where $d_i$ may be the priority queuing delay for packet i. Because the priority queue may not be first in, first out, the delay of a data packet in a priority queue may be calculated from the time when the data packet arrives to the moment when the data packet is put in the MODCOD queue. After the average packet delay is calculated, an exponentially filtered delay measurement $d_{exp}(t)$ may be calculate according to $$d_{exp}(t) = \alpha d_{avg}(t) + (1-\alpha) d_{exp}(t-1), 0 < \alpha \leq 1. \tag{24}$$

When $t=1$, $d_{exp}(t) = d_{avg}(t)$. The default value for smoothing factor $\alpha$ may be 0.25.

$d_{exp}(t)$ may be calculated for each priority associated with a given DVB-S2 carrier stream.

In block 502, an overall rate allocation may be calculated. It may be possible to use the estimated bandwidth, as in FIG. 4, for resource allocation purposes, but directly applying estimated bandwidth may not be the most appropriate approach for obtaining the offered capacity of the gateway 101. The capacity of the gateway 101 may be underutilized due to the oscillation in the code block buffer 204, and there may be errors in the bandwidth estimation. Providing a limited buffer cushion when calculating the offered capacity of the gateway 101 may make the chance of emptying the gateway 101 priority queues very low.

To calculate an overall rate allocation, an analytical formula for traffic rate may first be derived. There may be M IP gateways 105, and N priority queues for the NRT traffic 201 in the gateway 101 per CRO. Taking into account the buffer cushion, there may be a targeted queue size for each gateway 101/CRO priority queue, which may be denoted as $L_i^{tar}$, $i=1,\ldots,N$. The initial queue length for a certain time t may be $L_i^0$. $\lambda(t)$ may be the assigned rate for all M IP gateways 105 at time t, or the global IP gateway rate. $\mu(t)$ may be the instantaneous CRO code block buffer (CB) offered NRT service rate at time t, and $\hat{\mu}(t)$ may be the estimated bandwidth for the NRT traffic 201 of the DVB-S2 carrier stream associated with the CRO. There may be a weight $w_i$ for each priority queue in the gateway 101/CRO. There may also be a proposed weight, $\theta_{i,j}$, associated with IP gateway 105 j, $i=1,\ldots,M$, for traffic sent to priority queue i of the gateway 101/CRO.

As in FIG. 3 and FIG. 4, the gateway-IP gateway flow control may have an updating period, $\Delta T$, which may have a default value of 100 ms. There may be a cushion in the priority queue such that there is sufficient data to feed the code block buffer 204 at any time. The cushion may be $D_{tar}$(ms) amount of data, which may correspond to a total queue size of $L^{tar}$. $L^{tar}$ may be considered an overall buffer cushion. $L^{tar}$ may be calculated according to $$L^{tar} = \sum_{i=1}^{N} L_i^{tar} \tag{25}$$

$$= \sum_{i=1}^{N} (\Delta L_i + L_i^0)$$

$$= \sum_{i=1}^{N} \int_{t}^{t+\Delta T} \left[ \sum_{j=1}^{M} \theta_{i,j} \lambda(\tau) - w_i \mu(\tau) \right] d\tau + \sum_{i=1}^{N} L_i^0$$

$$\cong \sum_{i=1}^{N} \left[ \sum_{j=1}^{M} \theta_{i,j} \lambda(t) - w_i \hat{\mu}(t) \right] \cdot \Delta T + \sum_{i=1}^{N} L_i^0$$

$$= [\lambda(t) - \hat{\mu}(t)] \cdot \Delta T + L^0$$

where $\sum_{i=1}^{N} \sum_{j=1}^{M} \theta_{i,j} = 1$ and $\sum_{i=1}^{N} w_i = 1$.

By rearranging equation (25), $\lambda(t)$ may be expressed.

$$\lambda(t)\Delta T = \hat{\mu}(t)\left(\Delta T + \frac{L^{tar} - L^0}{\hat{\mu}(t)}\right) = \hat{\mu}(t)(\Delta T + D_{tar} - D_0) \tag{26}$$

$$\lambda(t) = \hat{\mu}(t)\left(1 + \frac{D_{tar} - D_0}{\Delta T}\right) = \hat{\mu}(t)\left(1 + \frac{\Delta D}{\Delta T}\right) \tag{27}$$

$\Delta D = D_{tar} - D_0$, $D_{tar}$ may be the cushion buffer time, and $D_0$ may be evaluated using the most recent delay measurement, as in block 501. $\hat{\mu}(t)$ may be obtained from the bandwidth estimation, as in FIG. 3. Because the size of the code block buffer 204 may be configured for, for example, 15 ms, in order to sufficiently feed the code block buffer 204, the configured value of $D_{tar}$ may be set to 20 ms.

$\lambda_i(t)$ may denote the assigned rate for priority queue i, $i=1,\ldots,N$. Each priority class may have a delay requirement $D_i^{tar}$. For the first $N-1$ priority queues $$\lambda_i(t) = w_i \hat{\mu}(t)\left(1 + \frac{D_i^{tar} - D_i^0}{\Delta T}\right) = w_i \hat{\mu}(t)\left(1 + \frac{\Delta D_i}{\Delta T}\right), \tag{28}$$

where $D_i^0$ may be associated with queue size $L_i^0$, which may valued using the most recent measurement of delay in priority queue i. For priority queue N, the assigned rate may be $$\lambda_N(t) = \lambda(t) - \sum_{i=1}^{N-1} \lambda_i(t) \tag{29}$$

k may be a flow control epoch, $k=1, 2, \ldots$ The overall assigned rate to all M of the IP gateways 105 may be $$\lambda(k+1) = \hat{\mu}(k)\left(1 + \beta \frac{\Delta D(k)}{\Delta T}\right) \tag{30}$$

The assigned rate for the first N−1 NRT priority queues may be $$\lambda_i(k+1) = w_i \hat{\mu}(k)\left(1 + \beta \frac{\Delta D_i(k)}{\Delta T}\right) \quad (31)$$

For N-th priority queue, the assigned rate may be $$\lambda_N(k+1) = \lambda(k+1) - \sum_{i=1}^{N-1} \lambda_i(k+1) \quad (32)$$

β may be a configurable parameter, 0<β≤1. When ΔD>0 or $\Delta D_i$>0, the default value of β may be 0.25 otherwise, β=1.

The packet delay may be measured either for each individual priority queue or averaged over the priority queues. The weights $w_i$ of the priority queues may not reflect the practical traffic mix, but may be used for QoS provisioning. For example, the weight of priority 1 traffic may be 0.8, but priority 1 traffic may usually be less than 30% of all of the NRT traffic 201, so such a bandwidth allocation may provide more bandwidth than is needed to high priority traffic. The unused bandwidth may be assigned to lower priority traffic by a cross-priority scheduling algorithm run by, for example, the multi-class scheduling module 208.

The resultant output of the calculation of the overall rate allocation may be $\lambda=[\lambda_1, \ldots, \lambda_N]$, where $$\lambda_{total} = \sum_{i=1}^{N} \lambda_i$$

may be the assigned overall rate for all of the IP gateways 105, and $[\lambda_1 \ldots \lambda_N]$ may represent the assigned overall rate for each priority.

In block 503, bandwidth allocations for individual IP gateways may be calculated. A 1 matrix $R=\{R_{ij}\}$ may be the demand rate and $G=\{G_{ij}\}$ may be the grant rate, i=1, ..., N, and j=1, ..., M, where M and N may represent the number of the IP gateways 105 and the number of priorities, respectively, serviced by the gateway 101/CRO. The default value for N may be 4. The demand rate R may be determined by NRT demand determination module 206, as discussed in FIG. 4.

$\lambda[\lambda_1, \ldots, \lambda_N]$ may be the assigned rate for each priority queue, where $$\lambda_{total} = \sum_{i=1}^{N} \lambda_i,$$

as calculated in block 502. If the total assigned rate is larger or equal to the total amount of demand, for example, $$\sum_{i=1}^{N} \sum_{j=1}^{M} R_{ij} \leq \lambda_{total},$$

then $$\eta = \eta_{total} \bigg/ \sum_{i=1}^{N} \sum_{j=1}^{M} R_{ij}, \quad (33)$$

then $G_{ij}=\eta R_{ij}$, i=1, ..., N, j=1, ..., M, so every grant is increased such that the excess rate is handed out proportionally to the demand.

If the total demand rate is larger than the total assigned rate, but not exceeded by a certain percentage, for example, $$\lambda_{total} < \sum_{i=1}^{N} \sum_{j=1}^{M} R_{ij} \leq \lambda_{total}(1+\theta)$$

then the rate assignment may go through each priority queue and assign rate proportionally until the total bandwidth. The default value for θ may be 30%.

For priorities 1 to N, $$R_i = \sum_{j=1}^{M} R_{ij},$$

i=1, ..., N. If $R_i \leq \lambda_i$, for example, the demand for i-th priority is less than the corresponding assigned rate, then the demand may be met, for example, $$G_i = \sum_{j=1}^{M} G_{ij} = R_i, \; G_{ij} = R_{ij}.$$

Otherwise, $G_i^{temp}\lambda_i$, a temporary grant rant may be the assigned rate. The residual rate may be $Z_i = \lambda_i - R_i$.

The rates assigned to the IP gateways 105 may be balanced.

$$Z_+ = \sum_{i\in\{Z_i>0\}} Z_i,$$

may represent a residual rate. The priority queue set may be $I^{Z-}=\{i, Z_i<0\}$ the unfilled set. $w_i$ may be the weight of priority queue i at the gateway 101. Assignment of the residual rate to the unfilled set may be based on a weighted round robin, until all of the residual rate has been assigned. The weighted round robin may work according to $$\varphi_i = w_i \bigg/ \sum_{i\in I^{Z-}} w_i, \quad (34)$$

where $\phi_i$ may be a re-configured weight for the round-robin. Whenever a priority demand is fulfilled, the priority demand may be taken out from the weighted round-robin and $\phi_i$ may be updated. Alternatively, a simple round-robin may also be used for assigning the residual rate.

$\Delta Z_i^+$ may be the assigned portion of the residual rate $Z_+$ for priority queue i. The rate assignment for originally unfulfilled priority queue i for all of the gateways 105 may be $G_i = G_i^{temp}\alpha\Delta Z_i^+$, i∈{i, $Z_i$<0}. For i=1, ..., N, the grant rate for priority queue i in the IP gateway 105 j may be $$G_{ij} = \left( R_{ij} \bigg/ \sum_{j=1}^{M} R_{ij} \right) \cdot G_i, \quad (35)$$

i∈{i, $Z_j$<0}, j=1, ..., M, for an individual IP gateway 105.

G={$G_{ij}$}, i=1, ..., N, j=1, M, may be the derived assignment matrix with grant rate based on the demand matrix R={$R_{ij}$} and the gateway 101/CRO rate vector λ=[$λ_1$, ..., $λ_N$]. The columns of G may be the priority based credit assignment to each of the IP gateways 105, and the summation of each column, $$G_j = \sum_{i=1}^{N} G_{ij},$$

may the total amount of rate assigned to that columns IP gateway 105.

If the total demand rate exceeds the total assigned rate by a certain percentage, for example, $$\sum_{i=1}^{N} \sum_{j=1}^{M} R_{ij} > λ_{total}(1+θ),$$

then the rate assignment may be demand-based and proportional for priority classes 1 to 3, and service plan based for priority class 4. The default value for θ may be 30%.

For priorities queues with priority levels 1 to 3, bandwidth allocation may be done as if the demand rate was not greater than total assigned rate. For priority queues with priority level 4, for example, priority queues handling bulk data, $u_{hj}$ may be the number of users in the j-th IP gateway 105, J=1, ..., M, with h-th service plan, h=1, ..., H where H is the number of service plans. $r_h^{max}$ may be the maximum rate of plan h, $r_h^{max} > r_{h+1}^{max}$. The value $u_{hj}$ may be reported by the IP gateway 105. The service plan may be known constant to the gateway 101.

$G_i$, i=1, ..., 3 may be the granted rate for priority queues with priority levels 1 to 3. The granted rate for priority queues with priority level 4 may be $$G_4 = λ_{total} - \sum_{i=1}^{3} G_i. \quad (36)$$

The granted rate for each of the IP gateways 105 may be based on the number of users weighted by the maximum plan rate. Thus, for the IP gateway 105 j, j=1, ..., M, $$G_{4j} = \frac{\sum_{h=1}^{H} u_{hj} \cdot r_h^{max}}{\sum_{j=1}^{M} \sum_{h=1}^{H} u_{hj} \cdot r_h^{max}} \cdot G_4 \quad (37)$$

When the network is congested, the assignment matrix, G={$G_{ij}$}, i=1, ..., N j=1, ..., M, may be derived based on the demand matrix R={$R_{ij}$}, the gateway 101 rate vector $λ_{total}$=[$λ_1$, ..., $λ_N$] and the user service plan. If a VSAT is in throttled status, the throttled rate may be applied instead of the plan rate for the VSAT.

The multi-class scheduling module 208 may be any suitable combination of hardware and software in the IP gateways 105 for scheduling data traffic within the IP gateway 105. Upon receiving the allocated bandwidth from the gateway 101, as in FIG. 5, the IP gateway 105 may schedule the data traffic based on the traffic priority, service plan and physical layer properties of the remote node, or VSAT. At certain intervals, the IP gateway 105 may send the demand request, as calculated by the NRT demand determination module 206, to the gateway 101, and may receive the assigned rate from the gateway 101, as determined by the resource allocation module 207. Because there may be pre-defined weights associated with each priority queue for the gateway 101, the assigned rate for each of the IP gateways 105 may also consist of a pre-calculated rate for each class of data traffic. Due to conservative allocation for high priority traffic classes at the gateway 101, the assigned rate for a high priority class may be more than the class actually needs. The residual rate can then be used by data traffic from lower priority classes. If the demand for high priority traffic is greater than the assigned rate, the scheduler may not schedule more than the assigned rate.

Each traffic class may consist of spoofed and non-spoofed TCP, as well as UDP flows. The scheduled traffic may be aggregated in a Performance Enhancing Proxy Backbone Protocol (PBP) queue conceptually local to the LAN connected to the gateway 101. Packets in PBPs may then be forwarded to the gateway 101 priority queues.

In referring to the updating period of the gateway 101 offered rate as the flow control, or updating period, the flow control interval between each of the IP gateways 105 and the gateway 101 may be 100 ms or more, and the scheduling epoch, or period, may not necessarily follow this period. The time slot for scheduling may be relatively small so that the delay difference, or jitter, introduced by the scheduler is mitigated. A scheduling period of 20 ms may be appropriate for the tradeoff of delay and complexity. ΔT may be the flow control updating period, and may be 100 ms, and Δt may be the scheduling period, and may be 20 ms. With a 20 ms time interval, 20 ms of data based on the offered rate may be transmitted at the class level. At the connection level, a VSAT connection may be allowed to transmit 20 ms of data at an assigned rate.

Different traffic classes may have different scheduling policies subject to the specific quality of service (QoS) requirements. For interactive traffic, which may be the highest priority of the NRT traffic 201, the network may schedule as much traffic as possible that exists in the system. For background traffic, system throughput may be gained at the cost of extra queuing delay for some connections. Fairness in terms of rate allocation is imposed across the VSATs. Each VSAT may have multiple flows in each class. The multi-class scheduling module 208 may manage traffic at the VSAT level.

Figure 6:
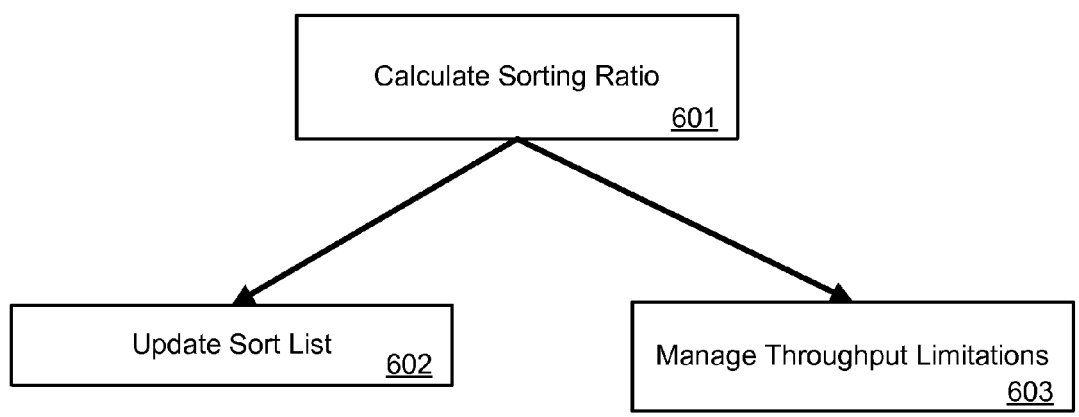
FIG. 6 depicts an exemplary procedure for multi-class scheduling.

FIG. 6 depicts an exemplary procedure for multi-class scheduling. Interactive, Multicast (Broadcast), Streaming and Bulk traffic may be schedule at the IP gateways 105 based on the Proportional Fair scheduling scheme. The RT traffic 202 may be admitted explicitly and, thus, may not part of the multi-class scheduling, since it may be passed through once admitted directly without backpressure. The multi-class scheduling module 208 may take into account the VSATs' rate plan, channel conditions at the satellite link, and the maximum throughput limit. This may help a VSAT achieve an average throughput proportional to the VSATs rate plan and, if applicable, in favor of those VSATs with good channel conditions.

The proportional fair scheduling scheme may aim to assign bandwidth to VSATs in a way such that the average throughput of a VSAT is proportional to the corresponding service rate plan across the all the VSATs. In addition, a modulation and coding (MODCOD) scheme may be used in bandwidth allocation so that the throughput provided to a terminal, such as a VSAT, may also be proportional to the efficiency of MODCOD at which the terminal is operating.

In block 601, a sorting ratio may be calculated. $A_i$ may be the service plan for the i-th user, and the base plan may be $A_0$. The plan ratio may be $A_i/A_0$.

The average throughput for i-th user may be $S_i$ and the instant assignment may be $R_i$, in bytes per scheduling frame. The default value for a scheduling time frame may be 20 ms. The exponential moving average (EMA) for the throughput at time t of VSAT i may be expressed as $$S_i(t)=\alpha \cdot R_i+(1-\alpha)\cdot S_i(t-1), \quad (38)$$

where $\alpha$ may be the smoothing factor determining the filter equivalent time constant. If the scheduling period is T, then the time constant $\tau$ of EMA may equal $$-\frac{T}{\ln(1-\alpha)}.$$

($\alpha$=0.1 may be equivalent to time constant $\tau \approx 10$ when T=1 frame).

The throughput vector may be $S(t)=[S_1(t), S_2(t), \ldots, S_N(t)]$, and the allocation rate vector may be $R(t)=[R_1(t), R_2(t), \ldots, R_N(t)]$, where N is the number of VSATs.

The multi-class scheduling module 208 may sort the ratio, $r_i(t)=S_i(t)/A_i$, at every frame or multiple frames in ascending order, and assign the bandwidth to the VSAT with the smallest ratio. If there are any resource left, the bandwidth may be assigned to the VSAT with second smallest ratio. Greedy filling may continue until the maximum throughput limit is achieved for a certain VSAT or the available bandwidth runs out. Once the bandwidth is assigned, the multi-class scheduling module 208 may update the above average throughputs formula. VSATs that are not scheduled at time t are given zero values.

When MODCOD is considered, the normalized value may be used in calculating the throughput ratio. ACM(j) may be the advanced modulation and coding scheme j, and ACM(0) may be the base MODCOD. The information rate of ACM(0) may be smallest among ACM(i)'s. The MODCOD coefficient may be $$\beta_i = \frac{Rate_{ACM(i)}}{Rate_{ACM(0)}}.$$

The ratio used for sorting may then be calculated by $$r_i(t) = \frac{S_i(t)}{\beta_i(t)A_i}. \quad (39)$$

If the MODCOD coefficient is forced to be 1, and the traffic of a VSAT is persistent, then Proportional Fair scheduling scheme may become Round Robin Equal Data; otherwise, it may become Round Robin Equal Time, since with the same air time, the VSAT with the better channel condition can transmit more data.

In block 602, the sorting list may be updated. The cost of sorting a large VSAT pool may be expensive. Sorting using proportional fair scheduling scheme may bring the throughput proportion to the desired target starting from the steepest step. The sort list may be updated every frame, since the throughput moving averaging could cover past 10 frames, the performance of the proportional fair scheduling scheme should not be diminished even if the sorting period is a few frames long.

There may be two ways to update the sorting list. The first may be periodic updating, for example, the multi-class scheduling module 208 may keep on using a sorting list for some time, given that the update duration is sufficiently longer than the sorting time. The second may be continuous updating, i.e., the updated sort list applies to scheduling immediately. For the purpose of efficiency, multiple frame updating may be used. The default updating period may be 2 to 5 frames.

Sorting time may be much smaller than the updating period. However, during sorting, the VSATs' states may be locked, thus the change in active and idle VSATs may be recorded and conveyed to the new sorting list.

t0 may be the starting time of the sorting, and T_sort may the lock period for sorting. During a sorting interval, the original scheduling sequence may be used. If there are new VSATS associated, or being admitted in, or existing VSATs become idle, the new VSATs may be added to the front of the current scheduling sequence. The idle VSATs may be moved out from the sorting list. If no VSATs move in or out, the scheduling link list may stay unchanged during the interval. When a new sort list comes into use, the sort list may be updated by adding newly arrived VSATs and removing the idled ones during the past T_sort time.

At any time t, bandwidth allocation may be based on the current sort list, allowing a VSAT on top of the sort list to aggressively use bandwidth until either a max rate limit is reached or all the packets in the VSAT's data queue are served. The remaining bandwidth may then be assigned to the next VSAT in the sort list. The same sort list may apply to each priority level of traffic, but there may be different end positions in each frame. This may be repeated in each priority level in Round Robin fashion until a new updated sort list comes into use.

In block 603, throughput limitations may be managed. The maximum throughput during a certain period of time may be capped for a VSAT based on the VSAT's service rate plan. The throughput limitation may be managed in every frame or every few frames. This may be achieved by a token bucket like scheme. To avoid unnecessary latency, the bucket size may be set shallow, for example, the period allowing a throughput burst from a VSAT may be small.

R0 (bits/sec) may be the terminal plan rate, T0 (ms) may be the scheduling frame and B0 may be the available bandwidth for scheduling, or tokens in the bucket. The token bucket scheme may allow up to B0=(K+1)*R0*T0 amount of data burst to be scheduled at one time, where K may be the number of frames allowed for accumulating assigned rate.

At each frame, the scheduler may assign R0*T0 amount of credit, or rate, to the bucket, while the multi-class scheduling module 208 may de-queue up to B0 amount of data from the particular data queues of one VSAT. The limiting period may be set to K frames (perceived as bucket size), where K may be a configurable parameter with default value of 1.

At the system level, a certain amount of bandwidth may be reserved for one priority, but at an individual VSAT, the VSAT's own high priority traffic may block access to bandwidth for the VSAT's lower priority traffic classes. Bucket splitting may be used to avoid this.

The initial credit in the bucket may be $B0(t)$. For priority level 1, $$R_{max,1}(t) = B0(t) - \text{Min}\left[B0\sum_{j=2}^{M} w_j, \sum_{j=2}^{M} q_j(t)\right], \quad (40)$$

where $R_{max,1}(t)(R_{max,1}(t) \geq 0)$ may be the maximum amount of data that can be de-queued from the priority level 1 queue, $w_j$ may be a pre-assigned weight for priority j class, M may be the number of priorities, and $q_j(t)$ may be the amount of data in the corresponding j-th priority queue for the specific VSAT.

A generic formula for the throughput limit of priority i for a particular VSAT may be $$R_{max,i}(t) = B0(t) - \sum_{j=1}^{i-1} A_j(t) - \text{Min}\left[B0\sum_{j=i+1}^{M} w_j, \sum_{j=i+1}^{M} q_j(t)\right], \quad (41)$$

where $R_{max,i}(t) \geq 0$, $A_j(t)$ may be the actual scheduled traffic (allocated bandwidth) for j-th priority at t.

If the bandwidth allocated for a certain priority level is not used up, the bandwidth may be used for subsequent priority classes. If the bandwidth allocated for one frame is not used up, the bandwidth may be carried over to the next frame. However, leftover bandwidth may not be carried over across the boundary of a flow control period.

For the very last frame of a flow control period, if there is leftover bandwidth from the lowest priority class, and if one or more higher priority classes have run out the allocated bandwidth during this frame, then the multi-class scheduling module 208 may need to go through a second pass to allow the higher priority classes to utilize the leftover bandwidth.

Because demand from each priority is taken care in the bandwidth allocation from the gateway 101, as determined by the resource allocation module 207, the allocated bandwidth to each priority of one of the IP gateways 105 may reflect both the demand and weighting. The allocated bandwidth to low priority traffic may be mostly fulfilled, especially when there is no leftover bandwidth from high priority classes. Therefore, the probability that a high priority class (e.g., interactive) is underserved while a low priority class has leftover bandwidth may be very small, and a second pass may not be needed.

The priority queue servicing module 209 may be any suitable combination of hardware and software at the gateway 101 to provide priority queue servicing for both the RT traffic 202 and certain classes of the NRT traffic 201. The DVB-S2 air interface may not specify a dedicated channel for the RT traffic 202. To provide differentiated and satisfactory quality of service for the RT traffic 201, including traffic for VoIP and video conferencing, and for certain classes of NRT traffic 201 with stringent latency requirement, the priority queue servicing module 209 may run at the gateway 101 and may improve latency performance while maintaining high spectrum utilization.

At the outroute of the satellite network, traffic data from multiple IP gateways 105 may be multiplexed at the gateway 101 before transmission via the DVB-S2 air interface, such as the RFT 106. Traffic classified into different priorities in the IP gateways 105 may be multiplexed into several priority queues in the gateway 101. The data packets at the gateway 101 may be further packed in DVB-S2 code blocks based on certain modulation and coding schemes before broadcasting.

To efficiently use the wireless spectrum, data packets being sent to different remote locations may be organized by an enhanced code rate organizer (CRO) so that each code block includes data with the same modulation and coding scheme.

The enhanced CRO may include two groups of queues, with each queue associated with a certain modulation and coding scheme. Each queue may be referred to as MODCOD queue. One of the groups of queues may be for the RT traffic 202, and the other group of queues may be for the NRT traffic 201. The queues for the RT traffic 202 may also handle latency sensitive portions of the NRT traffic 201.

A weighted fair queue algorithm may be used to feed the CRO with priority traffic classes coming from the IP gateways 105. The weighted fair queue algorithm may apply pre-assigned priority weights to prevent provisioning for high priority classes and starvation for low priority classes.

Figure 7:
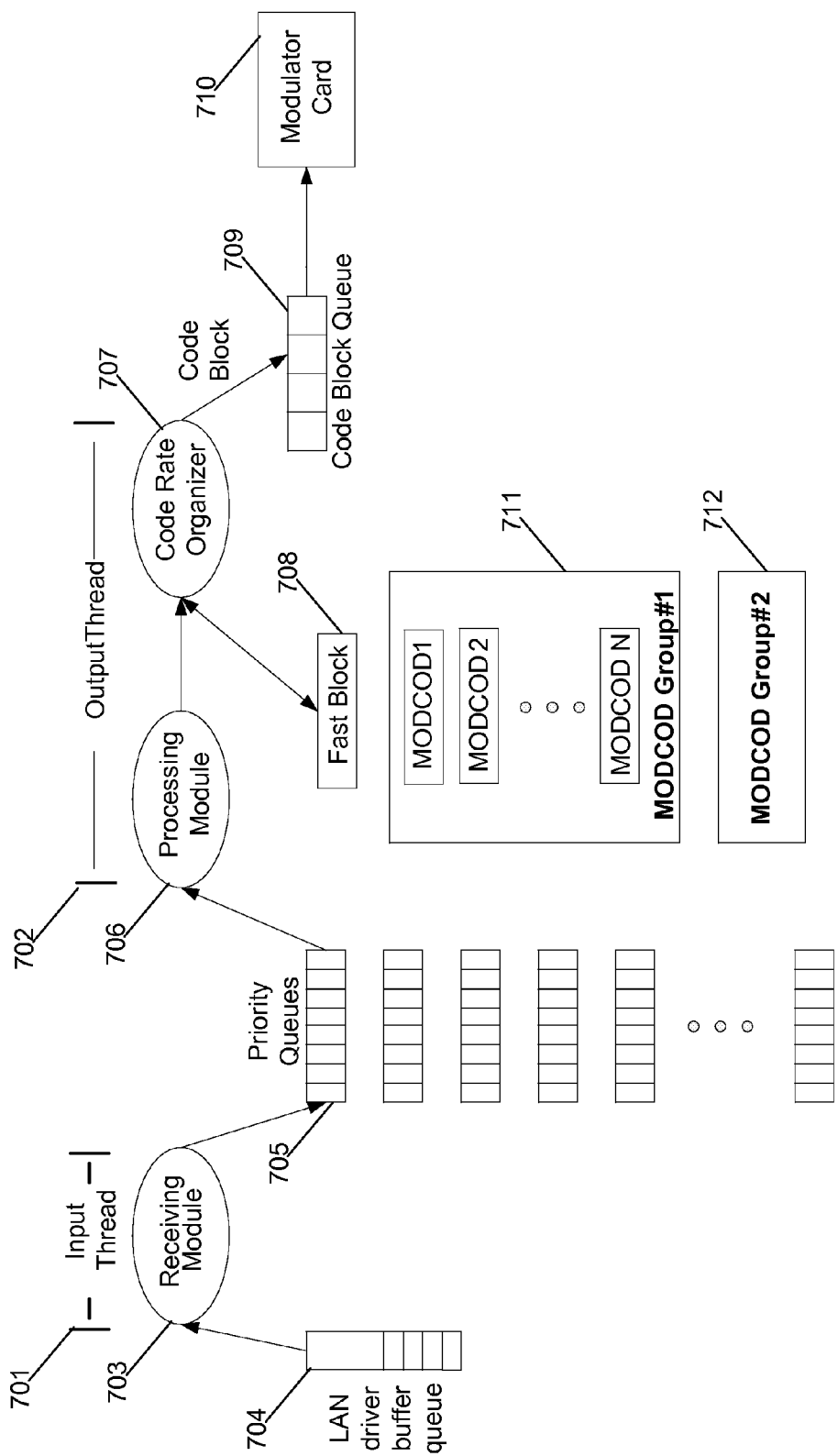
FIG. 7 depicts an exemplary queuing architecture.

FIG. 7 depicts an exemplary queuing architecture. Specially formatted IP packets may be passed from the IP gateway 105 to the gateway 101 and be processed through the gateway 101 IP stack and placed in an input LAN Driver Buffer Queue 704. The IP packets may be fragmented and may need to be reassembled. The gateway 101 Input Thread 701, including a Receiving Module 703, may be software on the gateway 101 that reads and reassembles incoming packets based upon the pre-assigned priority type, and moves the packets into the corresponding priority queue 705.

A processing module 706 and a code rate organizer module 707 may operate in an Output Thread 702, and may handle queue servicing and final DVB-S2 code block formation. In addition to the priority queues 705, that hold the re-assembled packets, the queuing architecture may include a fast block queue 708, two sets of queues each referred to as a MODCOD group, MODCOD group #1 711 and MODCOD group #2 712, and a Code Block Queue 709, which may be used to feed the DVB-S2 code blocks to the SGM Modulator cards 710 for physical layer transmission on the outroute.

The fast block queue 708 may be used for system traffic, may have the highest priority and may use the most robust MODCOD. The two MODCOD groups may each have a set of queues for each of the MODCODs supported in the system. The MODCOD group #1 711 may be used strictly for the RT traffic 202 and the highest priority traffic other than system traffic. All lower priority traffic, such as the NRT traffic 201, may be queued in the MODCOD group #2 712 queues.

Packets in the priority queues 705 may be sorted via MODCOD queue operation and then further moved into the Code Block Queue 709 before being transmitted. One parameter of the queuing architecture may be the value representing the target amount of data, represented in time, which may be intended to be maintained within the Code Block Queue 709. For example, if this value is 15 ms, then the queue servicing software may attempt to keep nominally 15 ms of code block data in this Code Block Queue 709. This may serve as a driver for timing in the gateway 101 Output Thread 702. The Processing Module 706 may serve as a slave to the Code Rate Organizer (CRO) 707 by extracting packets from the priority queues 705 and if needed formatting and providing the packets to the CRO 707. Alternatively, the packets may be sorted into the correct MODCOD queue depending on the traffic and MODCOD type. The highest priority and RT packets may be processed and placed in the MODCOD queues associated with MODCOD group #1 711, while the remaining priority packets may be stored in MODCOD group #2 712.

The Code Rate Organizer 707 of the gateway 101 Output Thread 702 may have the critical logic for servicing the queues within the MODCOD groups and satisfying delay and jitter requirements within the context of the gateway 101.

Incoming traffic from IP gateways 105 to the gateway 101 may include both the NRT traffic 201 and the RT traffic 202. The RT packets may be stored within an RT priority queue, while NRT packets may be stored within NRT priority queues. Each packet may have a MODCOD indicator which may reflect the channel condition at the destination VSAT. The packets in the priority queues 705 may be packed into DVB-S2 code blocks in the code block buffer 204 for physical layer transmission. The transmission of code blocks in the code block buffer 204 may be driven by the symbol rate.

The CRO 707 may organize the packets from the priority queues 705 into the code block buffer 204 for efficient transmission. The packets with the same MODCOD may be put into a single code block. In addition, the CRO 707 may also ensure that packets with stringent delay or jitter requirement are scheduled for transmission with a desired quality of service.

The packets in the priority queues 705 may be organized before being put in to the code block buffer 204. The MODCOD queues may be used for this purpose. There may be two MODCOD groups, MODCOD group #1 711, for the RT traffic 202, the MODCOD group #2 712, for the NRT traffic 201, each with the same number of MODCOD queues. Each MODCOD queue may represent certain type of modulation and coding scheme. The number of MODCOD queues in each group may equal the number of MODCOD schemes that are applied, and the MODCOD queues in each group are identical. The MODCOD queues may store the pointers that refer to the packets in the priority queues 705. There may be no actual data transfer between the priority queues 705 and MODCOD queues. The operation of a MODCOD queue may be first-in-first-out (FIFO).

To dequeue the RT traffic 202 from the priority queues 705 to the MODCOD queue whenever a packet arrives at the RT priority queue, a pointer to the packet may be packed into a corresponding MODCOD queue based on the packet's MODCOD indicator. To dequeue the NRT traffic 201, fulfilling the MODCOD queue may be periodic or event triggered based on the code block buffer 204 status. In the code block buffer 204, there may be threshold, $B_0$, which may represent the total amount of data stored in code block buffer 204. A larger $B_0$ may result in longer packet delays in the code block buffer 204, and a small $B_0$ may cause spectrum under-utilization. $B_0$ may be determined based on the equivalent average delay. By default, the code block buffer 204 threshold may be set to 15 ms worth of data. $B(t)$ may be the amount of data in the code block buffer 204 at time t, and $\Delta B(t)=B_0-B(t)$, or residual capacity.

For the RT traffic 202, the dequeuing from the RT priority queue to MODCOD group #1 711 may be continuous regardless of $\Delta B(t)$. For the NRT traffic 202, the code block buffer 204 threshold $B_0$ may be, for example, 15 ms worth of data by default. When $\Delta B(t) \leq 0$, no dequeuing of the NRT traffic 202 from lower priority queues to MODCOD group #2 712 queues may occur. When $\Delta B(t) > 0$, there may be up to $\Delta B(t)$ worth of data from the priority queues 705 moved to MODCOD group #1 711 or MODOCD group #2 712 queues.

The dequeuing of $\Delta B(t)$ worth of data from the NRT priority queues into MODCOD groups may be based on weighted queuing. Priority level 1 traffic, such as interactive traffic, may be either moved to the MODCOD group #1 711, or to the MODCOD group #2 712. Interactive traffic may more often be dequeued to the MODCOD group #1 711, along with the RT traffic 202. Time t may be discrete, so a periodic closed loop, for example, every 5 ms, may be sufficient. For event triggers, the dequeuing of the priority queue 705 may not happen until $\Delta B(t)$ reaches a certain amount, such as, for example, 5 ms worth of data.

When the data, by way of pointers to the data, is packed into the MODCOD queues, events may be generated to trigger the movement of data from MODCOD groups to the code block buffer 204. The events causing the formation of a code block may be the accumulations of a sufficient amount of data to form a code block and the expiration of timer. The code block formation event may signal that there is enough data in a MODCOD queue to form a DVB-S2 code block using one MODCOD scheme. There may be a timer associated with packets of each priority level. The timer of a MODCOD queue may be adjusted based on the first packet of a certain priority in the MODCOD queue. For example, if an interactive packet is placed in the front of MODCOD queue, the timer of this MODCOD queue may be associated with this interactive packet. When the timer expires, the data in the MODCOD queue, together with some data that can be borrowed from other MODCOD queues, may be used to form a code block and be moved into the code block buffer 204. The timer may be set to, for example, 15 ms by default, for packets from the RT traffic 202 and interactive packets from the NRT traffic 201. For lower priority packets from the NRT traffic 201, the timer may be longer, for example, 50 ms up to 200 ms.

When a timer expires, there may not be enough data to form a code block. In this case, borrowing between MODCOD queues may occur. Borrowing can happen inside a MODCOD group or across the two MODCOD groups. Borrowing may first be applied across MODCOD queues with the same MODCOD scheme. For example, if an MODCOD group #1 711 queue's timer expires and there is insufficient data to form a code block, data in the same level MODCOD queue in MODOC group #2 712 may be borrowed, and vice versa.

If there is not enough data to be borrowed in a MODCOD queue of the same level, the data from lower MODCOD level queues in the same and the other MODCOD group may be used. For example, if a code block of ¾ QPSK is not fulfilled, data may be borrowed from a ⅘ QPSK MODCOD queue, but not a ½ QPSK queue. Between the two MODCOD groups, data should be borrowed from the MODCOD group #1 711 first, and the MODCOD group #2 712 second.

If there is no qualifying data that can be borrowed, a code block may be filled with dummy packets, or null data.

The gateway 101 may poll the code block buffer at certain frequency, for example, every 5 ms, or use an event trigger which is based on a threshold of current buffer size. The remaining buffer size may be compared with the code block buffer 204 capacity, buffer size $B_0$, and the difference may be calculated as residual capacity.

The residual capacity, $\Delta B(t)$, may be used to fetch the packets from the priority queues 705 into the MODCOD queue groups. Such queue serving may follow the same timing as the polling schedule. There may be one RT and M NRT priority queues. The queue size for the RT queue may be $q_{RT}$ and the queue size for the NRT queues may be $q_{NRT,i}$, i=1, ..., M, $W=\{w_i\}$, i=1, ..., M may be the weights associated with the NRT queues. The queue servicing procedure may be accomplished in two ways.

In the first way, the RT traffic 202 may be dequeued from the priority queue 705 to the MODCOD group #1 711, regardless of the status of the code block buffer 204. For the NRT priority queues, $X_{NRT}=\Delta B(t)$. Data with a priority level of 1 may be dequeued into the MODCOD group #1 711, while the other priority queues 705 for the NRT traffic 201 may be sent to the MODCOD group #2 712. To dequeue the NRT queues to the MODCOD groups, for the ith level NRT queue, i=1, ..., M, $X_{NRT,i}=w_i \cdot X_{NRT}$ may be pre-calculated. If $q_{NRT,i} \geq X_{NRT,i}$, $X_{NRT,i}$ may be dequeued from the i-th queue to the MODCOD queues. Otherwise, $q_{NRT,i}$ may be dequeued from the i-th queue to the MODCOD queues. The remaining capacity, $w_i \cdot X_{NRT} - q_{NRT,i}$, may be attributed to the (i+1)-th priority queue, for example, $X_{NRT,i+1}=X_{NRT,i+1}+(w_i \cdot X_{NRT} - q_{NRT,i\ NRT})$. This may be repeated until all of the NRT queues have been served.

In the second way, dequeuing the RT traffic 202 may be based on the available code block buffer 204 capacity, so $X=\Delta B(t)$. If $X \leq q_{RT}$, then X worth of data may be dequeued from the RT queue to the MODCOD group #1 711, and no data may be dequeued from the NRT queues. Otherwise, $q_{RT}$ worth of data may be dequeued from the RT queue to the MODCOD group #1 711, $X_{NRT}=X-q_{RT}$ may be updated, and data may dequeued from the NRT queues to the MODCOD queues. For the ith level NRT queue, i=M, $X_{NRT,i}=w_i \cdot X_{NRT}$ may be pre-calculated, and, until all of the NRT queues are served, if $q_{NRT,i} \geq X_{NRT,i}$, $X_{NRT,i}$ worth of data my be dequeued from the i-th queue to the MODCOD queues, otherwise $q_{NRT,i}$ worth of data may be dequeued from the i-th queue to the MODCOD queues and the remaining capacity $w_i \cdot X_{NRT} - q_{NRT,i}$ may be attributed to (i+1)-th queue, $X_{NRT,i+1}=X_{NRT,i+1}(w_i \cdot X_{NRT} - q_{NRT,i})$.

The two ways of dequeuing data may become equivalent if the code block threshold for the RT traffic 202 is very large.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method for traffic management and resource allocation on a shared access network comprising:

estimating a bandwidth capacity of a gateway;

determining a demand rate, a traffic priority, and traffic weighting of an IP gateway;

allocating bandwidth to the IP gateway based on the estimated bandwidth capacity and at least one of the demand rate, the traffic priority, and the traffic weighting;

allocating bandwidth to the IP gateway in advance of demand when, based on the estimated bandwidth capacity, excess bandwidth is available;

scheduling traffic at the IP gateway based on at least one of the traffic priority, a service plan of a VSAT, and physical layer properties of the VSAT; and performing priority queue servicing of traffic at the gateway using a real time traffic priority queue, a non-real time traffic priority queue, at least two modulation and coding queue groups, and a code block queue, wherein estimating the bandwidth capacity is done according to the equation:

$$X = \sum_{i=1}^{N} \eta \cdot b_{CB} \cdot K_i \cdot \gamma_i = \frac{R \cdot \sum_{i=1}^{N} K_i \cdot \gamma_i}{\sum_{i=1}^{N} \frac{K_i}{M_i}}$$

where $\Delta T$ is the IP gateway-gateway flow control update period, N is the number of types of code blocks, $K_i$ is is the number of types of code blocks during the period of $\Delta T$, $M_i$ is the number of effective bits per symbol of type i, $b_{CB}$ is the total number of bits in one code block, S is the total number of symbols for all the code blocks in $\Delta T$ and is calculated as $$S = b_{CB} \sum_{i=1}^{N} \frac{K_i}{M_i},$$

R is the number of symbols per time $\Delta T$ according to a carrier stream symbol rate for the gateway, $\eta$ is the ratio $$\eta = \frac{R}{S} = \frac{R}{b_{CB} \sum_{i=1}^{N} \frac{K_i}{M_i}},$$

X is the total number of information bits during the time interval $\Delta T$, or estimated bandwidth capacity, and $\gamma_i$ is the code rate for code block type i.

2. A method for traffic management and resource allocation on a shared access network comprising:
  estimating a bandwidth capacity of a gateway;
  determining a demand rate, a traffic priority, and traffic weighting of an IP gateway;
  allocating bandwidth to the IP gateway based on the estimated bandwidth capacity and at least one of the demand rate, the traffic priority, and the traffic weighting;
  allocating bandwidth to the IP gateway in advance of demand when, based on the estimated bandwidth capacity, excess bandwidth is available;
  scheduling traffic at the IP gateway based on at least one of the traffic priority, a service plan of a VSAT, and physical layer properties of the VSAT; and
  performing priority queue servicing of traffic at the gateway using a real time traffic priority queue, a non-real time traffic priority queue, at least two modulation and coding queue groups, and a code block queue,
  wherein determining a demand rate of an IP gateway is done according to the equations:

$$R_{BE}(k+1) = \sum_{i=1}^{N} r_i(k+1),$$

$$R_{Interactive}^{upper}(k+1) = \frac{\min[\max(Y_{min}, Y_{k+1}^{upper}), Y_{max}]}{\Delta T} + \frac{\sum_{i=1}^{N} L_i(k)}{\Delta T},$$

and $$R_{Streaming}^{upper}(k+1) = \frac{\min[\max(Y_{min}, Y_{k+1}^{upper}), Y_{max}]}{\Delta T} + \frac{\sum_{i=1}^{N} L_i(k)}{\Delta T},$$

where $\Delta T$ is a predefined flow control update period with M measurement time frames, N is the number of active flows, $x_j^{(i)}$ is the measured traffic volume, in bytes or bits, of flow i at the j-th frame obtained by counting the instant amount of packets at j-th frame and multiplying that by the packet size in bytes or bits, $$y_j = \sum_{i=1}^{N} x_j^{(i)}$$

is the total arriving traffic volume of N $Y_k$ is the mean of total arriving traffic volume, $$Y_k = \frac{1}{M} \sum_{j=1}^{M} y_{M \cdot (k-1)+j},$$

$(Y_k)_{std}$ is the standard deviation of total arriving traffic volume $$(Y_k)_{std} = \sqrt{\frac{1}{M-1} \left( \sum_{j=1}^{M} y_{M \cdot (k-1)+j}^2 \right) - \frac{M}{M-1} Y_k^2}$$

where k indexes the update period $\Delta T$, $\overline{Y}_{k+1} = \beta \cdot Y_k + (1-\beta) \cdot \overline{Y}_k$ is the moving average of the mean $Y_k$, ($\overline{Y}_{k+1})_{std} = \beta \cdot (Y_k)_{std} + (1-\beta) \cdot (\overline{Y}_k)_{std}$ is the moving average of the standard deviation $(Y_k)_{std}$, $\beta$ is a weighing factor, $0 < \beta < 1$, $Y_{k+1}^{upper}$ is an upper demand estimation for interactive traffic, $Y_{k+1}^{upper} = \overline{Y}_{k+1} + d \cdot (\overline{Y}_{k+1})_{std}$, d is pre-determined with a default value of 3, $d \cdot (\overline{Y}_k)_{std}$ is a demand margin for all the flows of interactive traffic class in the IP gateway being serviced by a particular carrier stream, $\overline{Y}_{k+1}$ is a predicted bandwidth usage for (k+1)-th update cycle, $Y_{min}$ is a lower bound on predicted bandwidth usage, $Y_{max}$ is an upper bound on predicted bandwidth usage, $L_i(k)$ is a recent updated queue size of a VSAT i, $L_i(k) = L_i(k-1) + \lambda_i(k) \Delta k - \mu_i(k) \Delta k = L_i(k-1) + \lambda_i(k) \Delta k - A_i(k)$, $R_{Interactive}^{upper}(k+1)$ is the demand rate for interactive traffic, $R_{Streaming}^{upper}(k+1)$ is the demand rate for streaming traffic, $R_{BE}(k+1)$ is the demand rate for background traffic, $\lambda_i(k)$ is the input traffic rate, $$\lambda_i(k) = \frac{A_i(k) + L_i(k) - L_i(k-1)}{\Delta T},$$

$\lambda_i(k)$ is the service rate at cycle time k for connection i being serviced by a carrier stream, $A_i(k)$ is the total scheduled amount of traffic at time k, $\hat{\lambda}_i(k+1) = \alpha \lambda_i(k) + (1-\alpha) \hat{\lambda}_i(k)$ is a prediction function, $\alpha$ is a weighing factor, $0 < \alpha < 1$, $r_i(k)$ is the total traffic rate for time k and the predicted demand rate is $r_i(k+1) = L_i(k)/\Delta T + \hat{\lambda}_i(k+1)$.

3. A method for traffic management and resource allocation on a shared access network comprising:
  estimating a bandwidth capacity of a gateway;
  determining a demand rate, a traffic priority, and traffic weighting of an IP gateway;
  allocating bandwidth to the IP gateway based on the estimated bandwidth capacity and at least one of the demand rate, the traffic priority, and the traffic weighting;
  allocating bandwidth to the IP gateway in advance of demand when, based on the estimated bandwidth capacity, excess bandwidth is available;
  scheduling traffic at the IP gateway based on at least one of the traffic priority, a service plan of a VSAT, and physical layer properties of the VSAT; and
  performing priority queue servicing of traffic at the gateway using a real time traffic priority queue, a non-real time traffic priority queue, at least two modulation and coding queue groups, and a code block queue,
  wherein allocating bandwidth to the IP gateway is done according to the equations:
  where $N_t$ is the number of data packets put into MODCOD queues during the period of $t-\Delta t$ to t, $d_{avg}(t)$ is an average packet delay at time t, $$d_{avg}(t) = \sum_{i=1}^{N_t} d_i / N_t,$$

$d_i$ is the priority queuing delay for packet i, $d_{exp}(t)$ is an exponentially filtered delay measurement, $d_{exp}(t)=\alpha d_{avg}(t)+(1-\alpha)d_{exp}(t-1)$, $0<\alpha\leq 1$, calculated for each priority associated with a carrier stream, M is the number of IP gateways, N is the number of priority queues for non-real time traffic in the gateway per code rate organizer, $L_i^{tar}$, i=1, ..., N, is a targeted queue size for each priority queue, $L_i^0$ is an initial queue length for at time t, $\lambda(t)$ is an assigned rate for all M IP gateways 105 at time t, $\lambda(t)$ is an instantaneous code rate organizer code block buffer offered non-real time service rate at time t, $\hat{\mu}(t)$ is an estimated bandwidth for the non-real time traffic of the carrier stream associated with the code rate organizer, $w_i$ is a weight for each priority queue for the code rate organizer, $\theta_{i,j}$ is a proposed weight associated with the IP gateway j, i=1, ..., M, for traffic sent to priority queue i of the gateway, $\Delta T$ is a gateway-IP gateway flow control updating period, $D_{tar}$ is a cushion in the priority queue, $L^{tar}$ is an overall buffer cushion, $$L^{tar} = \sum_{i=1}^{N} L_i^{tar}$$

$$= \sum_{i=1}^{N} (\Delta L_i + L_i^0)$$

$$= \sum_{i=1}^{N} \int_{t}^{t+\Delta T} \left[\sum_{j=1}^{M} \theta_{i,j}\lambda(\tau) - w_i\mu(\tau)\right] d\tau + \sum_{i=1}^{N} L_i^0$$

$$\cong \sum_{i=1}^{N} \left[\sum_{j=1}^{M} \theta_{i,j}\lambda(\tau) - w_i\hat{\mu}(\tau)\right] \cdot \Delta T + \sum_{i=1}^{N} L_i^0$$

$$= [\lambda(t) - \hat{\mu}(t)] \cdot \Delta T + L^0,$$

-continued $$\sum_{i=1}^{N} \sum_{j=1}^{M} \theta_{i,j} = 1, \sum_{i=1}^{N} w_i = 1,$$

$$\lambda(t)\Delta T = \hat{\mu}(t)\left(\Delta T + \frac{L^{tar} - L^0}{\hat{\mu}(t)}\right) = \hat{\mu}(t)(\Delta T + D_{tar} - D_0),$$

$$\lambda(t) = \hat{\mu}(t)\left(1 + \frac{D_{tar} - D_0}{\Delta T}\right) = \hat{\mu}(t)\left(1 + \frac{\Delta D}{\Delta T}\right),$$

$\Delta D = D_{tar} - D_0$, $D_{tar}$ is the cushion buffer time, $D_0$ is evaluated using the most recent delay measurement $d_{exp}(t)$, $\hat{\mu}(t)$ is obtained from a bandwidth estimation, $\lambda_i(t)$ is the assigned rate for priority queue i, i=1, ..., N, $D_i^{tar}$ is a delay requirement for each priority class, $$\lambda_i(t) = w_i\hat{\mu}(t)\left(1 + \frac{D_i^{tar} - D_i^0}{\Delta T}\right) = w_i\hat{\mu}(t)\left(1 + \frac{\Delta D_i}{\Delta T}\right)$$

for N−1 priority queues, $D_i^0$ is be associated with queue size $L_i^0$, which is valued using the most recent measurement of delay in priority queue i, $$\lambda_N(t) = \lambda(t) - \sum_{i=1}^{N-1} \lambda_i(t)$$

for priority queue N, k is a a flow control epoch, k=1, 2, ..., an overall assigned rate to all M of the IP gateways is $$\lambda(k+1) = \hat{\mu}(k)\left(1 + \beta\frac{\Delta D(k)}{\Delta T}\right),$$

an assigned rate for the first N−1 non-real time priority queues is $$\lambda_i(k+1) = w_i\hat{\mu}(k)\left(1 + \beta\frac{\Delta D_i(k)}{\Delta T}\right),$$

$\beta$ is a configurable parameter, $0<\beta\leq 1$, $\lambda=[\lambda_1, ..., \lambda_N]$, $$\lambda_{total} = \sum_{i=1}^{N} \lambda_i$$

is an assigned overall rate for all of the IP gateways and $[\lambda_1, ..., \lambda N]$ is an assigned overall rate for each priority, a matrix $R=\{R_{ij}\}$ is a demand rate, $G=\{G_{ij}\}$ is a grant rate, i=1, ..., N, and $$j = 1, ..., M, \text{ if } \sum_{i=1}^{N}\sum_{j=1}^{M} R_{ij} \leq \lambda_{total}, \text{ then } \eta = \lambda_{total} \bigg/ \sum_{i=1}^{N}\sum_{j=1}^{M} R_{ij},$$

$i=1, \ldots, N, j=1, \ldots, M$, if $$\lambda_{total} < \sum_{i=1}^{N} \sum_{j=1}^{M} R_{ij} \le \lambda_{total}(1+\theta) \text{ then } R_i = \sum_{j=1}^{M} R_{ij},$$

$i=1, \ldots, N, Z_i = \lambda_i - R_i$ is a residual rate, $$Z_+ = \sum_{i \in \{Z_i > 0\}} Z_i,$$

may represent a residual rate, $I^{Z-} = \{i, Z_i < 0\}$, is an unfilled priority queue set, $$\varphi_i = w_i \Big/ \sum_{i \in I^{Z-}} w_i$$

is a weighted round robin, $\phi_i$ is a re-configured weight for the round robin, $\Delta Z_i^+$ is an assigned portion of the residual rate $Z_+$ for priority queue I, $G_i = G_i^{temp} + \Delta Z_i^+$, $i \in \{i, Z_i < 0\}$, $$G_{ij} = \left( R_{ij} \Big/ \sum_{j=1}^{M} R_{ij} \right) \cdot G_i,$$

$i \in \{i, Z_i < 0\}, j=1, \ldots, M, G = \{G_{ij}\}, i=1, \ldots, N, j=1, \ldots, M$, is a derived assignment matrix with grant rate based on the demand matrix $R = \{R_{ij}\}$ and $\lambda = [\lambda_1, \ldots, \lambda_N]$, $$G_j = \sum_{i=1}^{N} G_{ij},$$

is the total amount of rate assigned to that columns IP gateway.

4. A method for traffic management and resource allocation on a shared access network comprising:

estimating a bandwidth capacity of a gateway;

determining a demand rate, a traffic priority, and traffic weighting of an IP gateway;

allocating bandwidth to the IP gateway based on the estimated bandwidth capacity and at least one of the demand rate, the traffic priority, and the traffic weighting;

allocating bandwidth to the IP gateway in advance of demand when, based on the estimated bandwidth capacity, excess bandwidth is available;

scheduling traffic at the IP gateway based on at least one of the traffic priority, a service plan of a VSAT, and physical layer properties of the VSAT; and performing priority queue servicing of traffic at the gateway using a real time traffic priority queue, a non-real time traffic priority queue, at least two modulation and coding queue groups, and a code block queue, wherein scheduling traffic at the IP gateway further comprises:

calculating a sorting ratio according to the equation:

$$r_i(t) = \frac{S_i(t)}{\beta_i(t) A_i},$$

where $A_i$ is a service plan for the i-th user, $A_0$ is a base plan, $S_i$ is an average throughput for i-th user, $R_i$ is an instant assignment in bytes per scheduling frame, an exponential moving average for the throughput at a time t of a VSAT i is $S_i(t) = \alpha \cdot R_i + (1-\alpha) \cdot S_i(t-1)$, $\alpha$ is a smoothing factor determining a filter equivalent time constant, T is a scheduling period, $\tau$ is a time constant of the exponential moving average, $$\tau = -\frac{T}{\ln(1-\alpha)},$$

$S(t) = [S_1(t), S_2(t), \ldots, S_N(t)]$ is a throughput vector, $R(t) = [R_1(t), R_2(t), \ldots, R_N(t)]$ is an allocation rate vector, N is a number of VSATs, $$\beta_i = \frac{\text{Rate}_{ACM(i)}}{\text{Rate}_{ACM(0)}}$$

is a MODCOD coefficient, ACM(0) is a smallest information rate among advanced modulation and coding schemes ACM(i).

5. The method of claim 4, further comprising:

managing throughput limitations according with a token bucket scheme according to the equation:

$$R_{max,i}(t) = B0(t) - \sum_{j=1}^{i-1} A_j(t) - \text{Min}\left[ B0 \sum_{j=i+1}^{M} w_j, \sum_{j=i+1}^{M} q_j(t) \right]$$

where R0 (bits/sec) is a terminal plan rate, T0 is a scheduling frame, B0 is available bandwidth for scheduling where $R_{max,1}(t)$ is a maximum amount of data that can be de-queued from a priority level 1 queue, $w_j$ is a pre-assigned weight for priority j class, M is a number of priorities, $q_j(t)$ is an amount of data in the corresponding j-th priority queue for the specific VSAT, $A_j(t)$ and is actual allocated bandwidth for a j-th priority at t.

6. A system for traffic management and resource allocation on a shared access network comprising:

an IP gateway; and a gateway, wherein the gateway estimates a bandwidth capacity of the gateway, the IP gateway determines a demand rate, a traffic priority, and traffic weighting of the IP gateway, the gateway allocates bandwidth to the IP gateway based on the estimated bandwidth capacity, the demand rate, the traffic priority, and the traffic weighting, the IP gateway schedules traffic based on the traffic priority, a VSAT service plan, and physical layer properties of the VSAT, and the gateway performs priority queue servicing at the gateway, wherein the gateway estimates the bandwidth capacity according to the equation:

$$X = \sum_{i=1}^{N} \eta \cdot b_{CB} \cdot K_i \cdot \gamma_i = \frac{R \cdot \sum_{i=1}^{N} K_i \cdot \gamma_i}{\sum_{i=1}^{N} \frac{K_i}{M_i}}$$

where $\Delta T$ is the IP gateway-gateway flow control update period, N is the number of types of code blocks, $K_i$ is the number of types of code blocks during the period of $\Delta T$, $M_i$ is the number of effective bits per symbol of type i, $b_{CB}$ is the total number of bits in one code block, S is the total number of symbols for all the code blocks in $\Delta T$ and is calculated as $$S = b_{CB} \sum_{i=1}^{N} \frac{K_i}{M_i},$$

R is the number of symbols per time $\Delta T$ according to a carrier stream symbol rate for the gateway, $\eta$ is the ratio $$\eta = \frac{R}{S} = \frac{R}{b_{CB} \sum_{i=1}^{N} \frac{K_i}{M_i}},$$

X is the total number of information bits during the time interval $\Delta T$, or estimated capacity, and $\gamma_i$ is the code rate for code block type i.

7. A system for traffic management and resource allocation on a shared access network comprising:
   an IP gateway; and
   a gateway,
   wherein the gateway estimates a bandwidth capacity of the gateway, the IP gateway determines a demand rate, a traffic priority, and traffic weighting of the IP gateway, the gateway allocates bandwidth to the IP gateway based on the estimated bandwidth capacity, the demand rate, the traffic priority, and the traffic weighting, the IP gateway schedules traffic based on the traffic priority, a VSAT service plan, and physical layer properties of the VSAT, and the gateway performs priority queue servicing at the gateway,
   wherein the IP gateway determines the demand according to the equations:

$$R_{BE}(k+1) = \sum_{i=1}^{N} r_i(k+1),$$

$$R_{Interactive}^{upper}(k+1) = \frac{\min[\max(Y_{min}, Y_{k+1}^{upper}), Y_{max}]}{\Delta T} + \frac{\sum_{i=1}^{N} L_i(k)}{\Delta T},$$

and

-continued $$R_{Streaming}^{upper}(k+1) = \frac{\min[\max(Y_{min}, Y_{k+1}^{upper}), Y_{max}]}{\Delta T} + \frac{\sum_{i=1}^{N} L_i(k)}{\Delta T},$$

where $\Delta T$ is a predefined flow control update period with M measurement time frames, N is the number of active flows, $x_j^{(i)}$ is the measured traffic volume, in bytes or bits, of flow i at the j-th frame obtained by counting the instant amount of packets at j-th frame and multiplying that by the packet size in bytes or bits, $$y_j = \sum_{i=1}^{N} x_j^{(i)}$$

is the total arriving traffic volume of N $Y_k$ is the mean of total arriving traffic volume, $$Y_k = \frac{1}{M} \sum_{j=1}^{M} y_{M \cdot (k-1)+j},$$

is the standard deviation of total arriving traffic volume $$(Y_k)_{std} = \sqrt{\frac{1}{M-1} \left( \sum_{j=1}^{M} y_{M \cdot (k-1)+j}^2 \right) - \frac{M}{M-1} Y_k^2}$$

where k indexes the update period $\Delta T$, $\overline{Y}_{k+1} = \beta \cdot Y_k + (1-\beta) \cdot \overline{Y}_k$ is the moving average of the mean $Y_k$, ($\overline{Y}_{k+1})_{std} = \beta \cdot (Y_k)_{std} + (1-\beta) \cdot (\overline{Y}_k)_{std}$ is the moving average of the standard deviation $(Y_k)_{std}$, $\beta$ is a weighing factor, $0<\beta<1$, $Y_{k+1}^{upper}$ is an upper demand estimation for interactive traffic, $Y_{k+1}^{upper} = \overline{Y}_{k+1} \cdot d \cdot (\overline{Y}_{k+1})_{std}$, d is pre-determined with a default value of 3, $d \cdot (\overline{Y}_k)_{std}$ is a demand margin for all the flows of interactive traffic class in the IP gateway being serviced by a particular carrier stream, $\overline{Y}_{k+1}$ is a predicted bandwidth usage for (k+1)-th update cycle, $Y_{min}$ is a lower bound on predicted bandwidth usage, $Y_{max}$ is an upper bound on predicted bandwidth usage, $L_i(k)$ is a recent updated queue size of a VSAT i, $L_i(k) = L_i(k-1) + \lambda_i(k) \Delta k - \mu_i(k) \Delta k = L_i(k-1) + \lambda_i(k) \Delta k - A_i(k)$, $R_{Interactive}^{upper}(k+1)$ is the demand rate for interactive traffic, $R_{Streaming}^{upper}(k+1)$ is the demand rate for streaming traffic, $R_{BE}(k+1)$ is the demand rate for background traffic, $\lambda_i(k)$ is the input traffic rate, $$\lambda_i(k) = \frac{A_i(k) + L_i(k) - L_i(k-1)}{\Delta T},$$

$\mu_i(k)$ is the service rate at cycle time k for connection i being serviced by a carrier stream, $A_i(k)$ is the total scheduled amount of traffic at time k, $\hat{\lambda}_i(k+1) = \alpha \lambda_i(k) + (1-\alpha)\hat{\lambda}_i(k)$ is a prediction function, $\alpha$ is a weighing factor, $0<\alpha<1$, $r_i(k)$ is the total traffic rate for time k and the predicted demand rate is $r_i(k+1) = L_i(k)/\Delta T + \hat{\lambda}_i(k+1)$.

8. A system for traffic management and resource allocation on a shared access network comprising:
   an IP gateway; and
   a gateway, wherein the gateway estimates a bandwidth capacity of the gateway, the IP gateway determines a demand rate, a traffic priority, and traffic weighting of the IP gateway, the gateway allocates bandwidth to the IP gateway based on the estimated bandwidth capacity, the demand rate, the traffic priority, and the traffic weighting, the IP gateway schedules traffic based on the traffic priority, a VSAT service plan, and physical layer properties of the VSAT, and the gateway performs priority queue servicing at the gateway, wherein the gateway allocated bandwidth to the IP gateway according to the equations:

where $N_t$ is the number of data packets put into MODCOD queues during the period of $t-\Delta t$ to t, $d_{avg}(t)$ is an average packet delay at time t, $$d_{avg}(t) = \sum_{i=1}^{N} d_i / N_t,$$

$d_i$ is the priority queuing delay for packet i, $d_{exp}(t)$ is an exponentially filtered delay measurement, $d_{exp}(t)=\alpha d_{avg}(t)+(1-\alpha)d_{exp}(t-1)$, $0<\alpha\leq 1$, calculated for each priority associated with a carrier stream, M is the number of IP gateways, N is the number of priority queues for non-real time traffic in the gateway per code rate organizer, $L_i^{tar}$, $i=1,\ldots,N$, is a targeted queue size for each priority queue, $L_i^0$ is an initial queue length for at time t, $\lambda(t)$ is an assigned rate for all M IP gateways 105 at time t, $\mu(t)$ is an instantaneous code rate organizer code block buffer offered non-real time service rate at time t, $\hat{\mu}(t)$ is an estimated bandwidth for the non-real time traffic of the carrier stream associated with the code rate organizer, $w_i$ is a weight for each priority queue for the code rate organizer, $\theta_{i,j}$ is a proposed weight associated with the IP gateway j, $i=1,\ldots,M$, for traffic sent to priority queue i of the gateway, $\Delta T$ is a gateway-IP gateway flow control updating period, $D_{tar}$ is a cushion in the priority queue, $L^{tar}$ is an overall buffer cushion, $$L^{tar} = \sum_{i=1}^{N} L_i^{tar}$$

$$= \sum_{i=1}^{N} (\Delta L_i + L_i^0)$$

$$= \sum_{i=1}^{N} \int_{t}^{t+\Delta T} \left[\sum_{j=1}^{M} \theta_{i,j}\lambda(\tau) - w_i\mu(\tau)\right] d\tau + \sum_{i=1}^{N} L_i^0$$

$$\cong \sum_{i=1}^{N} \left[\sum_{j=1}^{M} \theta_{i,j}\lambda(t) - w_i\hat{\mu}(t)\right] \cdot \Delta T + \sum_{i=1}^{N} L_i^0$$

$$= [\lambda(t) - \hat{\mu}(t)] \cdot \Delta T + L^0,$$

$$\sum_{i=1}^{N} \sum_{j=1}^{M} \theta_{i,j} = 1,$$

$$\sum_{i=1}^{N} w_i = 1,$$

$$\lambda(t)\Delta T = \hat{\mu}(t)\left(\Delta T + \frac{L^{tar} - L^0}{\hat{\mu}(t)}\right) = \hat{\mu}(t)(\Delta T + D_{tar} - D_0),$$

-continued $$\lambda(t) = \hat{\mu}(t)\left(1 + \frac{D_{tar} - D_0}{\Delta T}\right) = \hat{\mu}(t)\left(1 + \frac{\Delta D}{\Delta T}\right),$$

$\Delta D = D_{tar} - D_0$, $D_{tar}$ is the cushion buffer time, $D_0$ is evaluated using the most recent delay measurement $d_{exp}(t)$, $\hat{\mu}(t)$ is obtained from a bandwidth estimation, $\lambda_i(t)$ is the assigned rate for priority queue i, $i=1,\ldots,N$, $D_i^{tar}$ is a delay requirement for each priority class, $$\lambda_i(t) = w_i\hat{\mu}(t)\left(1 + \frac{D_i^{tar} - D_i^0}{\Delta T}\right) = w_i\hat{\mu}(t)\left(1 + \frac{\Delta D_i}{\Delta T}\right)$$

for N−1 priority queues, $D_i^0$ be associated with queue size $L_i^0$, which is valued using the most recent measurement of delay in priority queue i, $$\lambda_N(t) = \lambda(t) - \sum_{i=1}^{N-1} \lambda_i(t)$$

for priority queue N, k is a a flow control epoch, $k=1,2,\ldots$, an overall assigned rate to all M of the IP gateways is $$\lambda(k+1) = \hat{\mu}(k)\left(1 + \beta\frac{\Delta D(k)}{\Delta T}\right),$$

an assigned rate for the first N−1 non-real time priority queues is $$\lambda_i(k+1) = w_i\hat{\mu}(k)\left(1 + \beta\frac{\Delta D_i(k)}{\Delta T}\right),$$

$\beta$ is a configurable parameter, $0<\beta\leq 1$, $\lambda=[\lambda_1,\ldots,\lambda_N]$, $$\lambda_{total} = \sum_{i=1}^{N} \lambda_i$$

is an assigned overall rate for all of the IP gateways and $[\lambda_1,\ldots,\lambda_N]$ is an assigned overall rate for each priority, a matrix $R=\{R_{ij}\}$ is a demand rate, $G=\{G_{ij}\}$ is a grant rate, $i=1,\ldots,N$, and $j=1,\ldots,M$, if $$\sum_{i=1}^{N}\sum_{j=1}^{M} R_{ij} \leq \lambda_{total}, \text{ then } \eta = \lambda_{total} \bigg/ \sum_{i=1}^{N}\sum_{j=1}^{N} R_{ij},$$

$G^{ij}=\eta R_{ij}$, $i=1,\ldots,N$, $j=1,\ldots,M$, if $$\lambda_{total} < \sum_{i=1}^{N}\sum_{j=1}^{M} R_{ij} \leq \lambda_{total}(1+\theta) \text{ then } R_i = \sum_{j=1}^{M} R_{ij},$$

$i=1, \ldots, N$, $Z_i=\lambda_i-R_i$ is a residual rate, $$Z_+ = \sum_{i \in \{Z_i>0\}} Z_i,$$

may represent a residual rate, $I^{Z-}=\{i,Z_i>0\}$, is an unfilled priority queue set, $$\varphi_i = w_i \Big/ \sum_{i \in I^{Z-}} w_i$$

is a weighted round robin, $\varphi_i$ is a re-configured weight for the round robin, $\Delta Z_i^+$ is an assigned portion of the residual rate $Z_+$ for priority queue I, $G_i=G_i^{temp}+\Delta Z_i^+$, $i \in \{i,Z_i<0\}$, $$G_{ij} = \left(R_{ij} \Big/ \sum_{j=1}^{M} R_{ij}\right) \cdot G_i,$$

$i \in \{i,Z_i<0\}$, $j=1, \ldots, M$, $G=\{G_{ij}\}$, $i=1, \ldots, N$, $j=1, \ldots, M$, is a derived assignment matrix with grant rate based on the demand matrix $R=\{R_{ij}\}$ and $\lambda=[\lambda_1, \ldots, \lambda_N]$, $$G_j = \sum_{i=1}^{N} G_{ij},$$

is the total amount of rate assigned to that columns IP gateway.

9. A system for traffic management and resource allocation on a shared access network comprising:
an IP gateway; and
a gateway,
wherein the gateway estimates a bandwidth capacity of the gateway, the IP gateway determines a demand rate, a traffic priority, and traffic weighting of the IP gateway, the gateway allocates bandwidth to the IP gateway based on the estimated bandwidth capacity, the demand rate, the traffic priority, and the traffic weighting, the IP gateway schedules traffic based on the traffic priority, a VSAT service plan, and physical layer properties of the VSAT, and the gateway performs priority queue servicing at the gateway, wherein IP gateway schedules traffic by calculating a sorting ratio according to the equation:

$$r_i(t) = \frac{S_i(t)}{\beta_i(t)A_i},$$

where
$A_i$ is a service plan for the i-th user, $A_0$ is a base plan, $S_i$ is an average throughput for i-th user, $R_i$ is an instant assignment in bytes per scheduling frame, an exponential moving average for the throughput at a time t of a VSAT i is $S_i(t)=\alpha \cdot R_i+(1-\alpha) \cdot S_i(t-1)$, $\alpha$ is a smoothing factor determining a filter equivalent time constant, T is a scheduling period, $\tau$ is a time constant of the exponential moving average, $$\tau = -\frac{T}{\ln(1-\alpha)},$$

$S(t)=[S_1(t), S_2(t), \ldots, S_N(t)]$ is a throughput vector, $R(t)=[R_1(t), R_2(t), \ldots, R_N(t)]$ is an allocation rate vector, N is a number of VSATs, $$\beta_i = \frac{Rate_{ACM(i)}}{Rate_{ACM(0)}}$$

is a MODCOD coefficient, ACM(0) is a smallest information rate among advanced modulation and coding schemes ACM(i).

10. The system of claim 9, wherein the IP gateway schedules traffic by managing throughput limitations according with a token bucket scheme according to the equation:

$$R_{max,i}(t) = B0(t) - \sum_{j=1}^{i-1} A_j(t) - \text{Min}\left[B0 \sum_{j=i+1}^{M} w_j, \sum_{j=i+1}^{M} q_j(t)\right]$$

where R0 (bits/sec) is a terminal plan rate, T0 is a scheduling frame, B0 is available bandwidth for scheduling where $R_{max,1}(t)$ is a maximum amount of data that can be de-queued from a priority level 1 queue, $w_j$ is a pre-assigned weight for priority j class, M is a number of priorities, $q_j(t)$ is an amount of data in the corresponding j-th priority queue for the specific VSAT, $A_j(t)$ and is actual allocated bandwidth for a j-th priority at t.

* * * * *